US012710890B2

(12) United States Patent
Luo

(10) Patent No.: US 12,710,890 B2
(45) Date of Patent: Aug. 18, 2026

(54) MEMORY SYSTEMS AND METHODS OF OPERATING THEREOF, COMPUTER-READABLE STORAGE MEDIUMS

(71) Applicant: YANGTZE MEMORY TECHNOLOGIES CO., LTD., Wuhan (CN)

(72) Inventor: Xianwu Luo, Wuhan (CN)

(73) Assignee: Yangtze Memory Technologies Co., Ltd., Wuhan (CN)

(*) Notice: Subject to any disclaimer, the term of this patent is extended or adjusted under 35 U.S.C. 154(b) by 0 days.

(21) Appl. No.: 18/821,605

(22) Filed: Aug. 30, 2024

(65) Prior Publication Data

US 2025/0298535 A1 Sep. 25, 2025

(30) Foreign Application Priority Data

Mar. 25, 2024 (CN) ......................... 202410346409.2

(51) Int. Cl.
*G06F 3/06* (2006.01)

(52) U.S. Cl.
CPC .......... *G06F 3/0652* (2013.01); *G06F 3/0604* (2013.01); *G06F 3/0679* (2013.01)

(58) Field of Classification Search
CPC ..... G06F 3/0652; G06F 3/0604; G06F 3/0679
See application file for complete search history.

(56) References Cited

U.S. PATENT DOCUMENTS

2020/0225867 A1* 7/2020 Lee ........................ G06F 3/0652
2022/0342812 A1* 10/2022 Cariello .............. G06F 12/0882

* cited by examiner

*Primary Examiner* — Francisco A Grullon
(74) *Attorney, Agent, or Firm* — Conley Rose, P.C

(57) ABSTRACT

Examples disclose a memory system and operating method thereof and computer-readable storage medium. An example memory system includes a memory controller and a memory coupled to the memory controller. The memory includes multiple memory blocks, a memory block includes multiple physical pages. The memory controller is configured to: determine at least one source memory block from the multiple memory blocks; in response to the bitmap type associated with a first source memory block from the at least one source memory block being a first bitmap, write valid data stored in the first source memory block into the first target memory block from the multiple memory blocks; in response to the valid data being written into the first target memory block, erase the source memory block.

20 Claims, 12 Drawing Sheets

MEMORY SYSTEMS AND METHODS OF OPERATING THEREOF, COMPUTER-READABLE STORAGE MEDIUMS

CROSS-REFERENCE TO RELATED APPLICATIONS

The present application claims the benefit of priority to China Application No. 202410346409.2, filed on Mar. 25, 2024, the content of which is incorporated herein by reference in its entirety.

FIELD OF TECHNOLOGY

Examples of the present disclosure relate to the field of semiconductor technology and relate to but are not limited to a memory system and operating method thereof and computer-readable storage medium.

BACKGROUND

A memory device is divided into a volatile memory device and a non-volatile memory device according to whether the stored data being retained when the power is off, where the non-volatile memory device that retains data when power is off may include Read-Only Memory (ROM) device and flash memory device. Taking flash memory device as an example, since a flash memory device cannot be overwritten, to ensure that the flash memory device has sufficient storage space to store data, invalid data is cleared to release the space occupied by invalid data and free up available storage space.

SUMMARY

According to a first aspect of an example of the present disclosure, a memory system is provided, where the memory system includes: a memory controller and a memory device coupled to the memory controller; the memory device includes multiple memory blocks, the memory block includes multiple physical pages, and the memory controller is configured to: determine at least one source memory block from the multiple memory blocks; in response to the bitmap type associated with a first source memory block from the at least one source memory block being a first bitmap, write valid data stored in the first source memory block into the first target memory block from the multiple memory blocks; where the first bitmap includes at least one first logical value, the first logical value is to identify a physical page which stores the valid data from the multiple physical pages in the memory block; the first target memory block is different from the source memory block; in response to the valid data being written into the first target memory block, erase the source memory block.

According to a second aspect of an example of the present disclosure, a method of operating a memory system is provided, where the memory system includes: a memory controller and a memory device coupled to the memory controller; the memory device includes multiple memory blocks, the memory block includes multiple physical pages, and the operating method includes: determining at least one source memory block from the multiple memory blocks; in response to the bitmap type associated with a first source memory block from the at least one source memory block being a first bitmap, writing valid data stored in the first source memory block into the first target memory block from the multiple memory blocks; where the first bitmap includes at least one first logical value, the first logical value is to identify a physical page which stores the valid data from the multiple physical pages in the memory block; the first target memory block is different from the source memory block; in response to the valid data being written into the first target memory block, erasing the source memory block.

According to a third aspect of an example of the present disclosure, a computer readable storage media is provided, instructions are stored on the computer readable storage media, and the instructions, when executed by a processor, implement the operating method of any one of the examples in the second aspect of examples of the present disclosure.

BRIEF DESCRIPTION OF THE DRAWINGS

In the accompanying drawings, unless otherwise specified, same reference numbers refer to same or similar parts or elements throughout multiple accompanying drawings. The accompanying drawings are not necessarily to scale. It should be understood that these accompanying drawings depict only some examples disclosed in accordance with the present application and should not be considered as limiting the scope of the present application.

DETAILED DESCRIPTION

Figure 1:
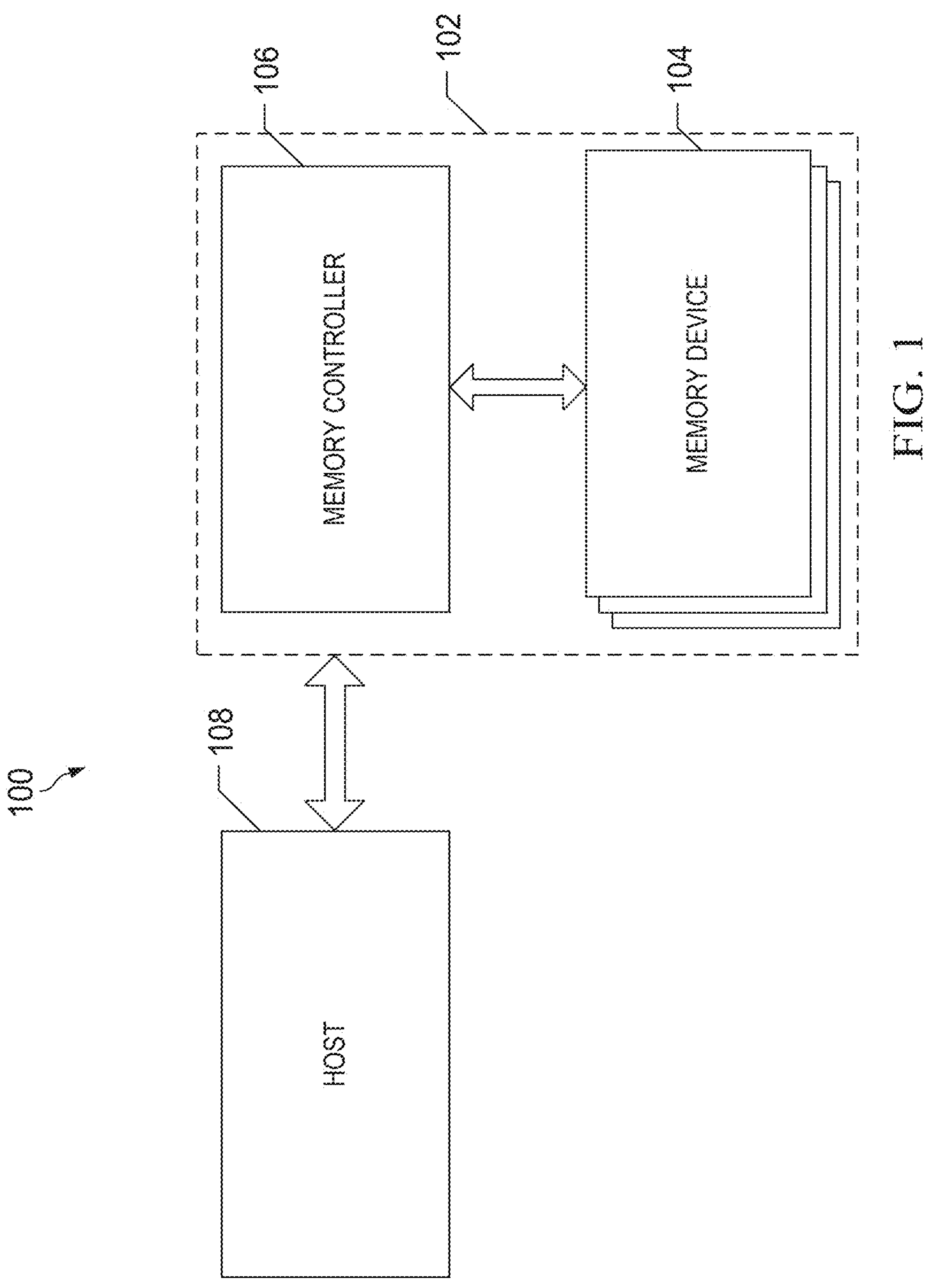
FIG. 1 is a schematic diagram of an electronic device shown according to an example of the present disclosure.

To facilitate understanding of the present disclosure, examples of the present disclosure will be described in more detail below with reference to the relevant accompanying drawings. Although example implementations of the present disclosure are shown in the accompanying drawings, it should be understood that the present disclosure may be implemented in various forms and should not be limited to the implementations set forth herein. Rather, these examples are provided so that the present disclosure can be more thoroughly understood and the scope of the present disclosure can be fully conveyed to those skilled in the art.

In the following description, numerous details are given in order to provide a more thorough understanding of the present disclosure. However, it will be apparent to one skilled in the art that the present disclosure may be practiced without one or more of these details. In some examples, in order to avoid confusion with the present disclosure, some technical features known in the art are not described; that is, not all features of the actual example may be described here, and well-known functions and structures may be not described in detail.

Generally, a term may be understood, at least in part, from context of use. For example, depending at least in part on context, the term "one or more" as used herein may be used in the singular to describe any feature, structure or characteristic, or may be used in the plural to describe a combination of features, structures or characteristics. Similarly, terms such as "a" or "the" may equally be understood to convey a singular usage or to convey a plural usage, depending at least in part on the context. Additionally, the term "based on" may be understood as not necessarily intended to convey an exclusive set of factors, and may alternatively allow for the presence of additional factors that are not necessarily explicitly described, which again depends at least in part on context.

Unless otherwise defined, the terminology used herein is for the purpose of describing a particular example only and is not to be considered as limitation of the present disclosure. As used herein, the singular forms "a", "an" and "said/the" are intended to include the plural forms as well, unless the context clearly dictates otherwise. It should also be understood that the terms "consists of", "comprising" and/or "including", when used in this description, identify the presence of stated features, integers, steps, operations, elements and/or parts, but do not exclude the presence or addition of one or more other features, integers, steps, operations, elements, parts and/or groups. As used herein, the term "and/or" includes any and all combinations of the associated listed items.

In order to thoroughly understand the present disclosure, detailed operations and detailed structures will be provided in the following description, so as to explain the technical solution of the present disclosure. Preferred examples of the present disclosure are described in detail as follows, however, the present disclosure may have other examples other than these detailed descriptions.

Memory devices in examples of the present disclosure include but are not limited to a three-dimensional NAND memory device, and for case of understanding, a three-dimensional NAND memory device is used as an example for illustration.

FIG. 1 is a schematic diagram of an electronic device 100 shown according to an example of the present disclosure. The electronic device 100 may be a mobile phone, a desktop computer, a laptop computer, a tablet, a vehicle computer, a gaming console, a printer, a positioning device, a wearable electronic device, a smart sensor, a Virtual Reality (VR) device, an Augmented Reality (AR) device, or any other suitable electronic devices having memory device therein. Referring to FIG. 1, the electronic device 100 may include a host 108 and a memory system 102, and the memory system 102 has one or more memory device 104 and a memory controller 106. The host 108 may be a processor of an electronic device (e.g., a Central Processing Unit (CPU)) or a System on Chip (SoC) (e.g., an Application Process (AP)). Host 108 may be configured to send data to or receive data from memory device 104.

According to some implementations, memory controller 106 is coupled to memory device 104 and host 108 and is configured to control memory device 104. The memory controller 106 may manage data stored in the memory device 104 and communicate with the host 108. In some implementations, the memory controller 106 is designed to operate in low duty cycle environments, e.g., Secure Digital (SD) card, Compact Flash (CF) card, Universal Serial Bus (USB) flash drive, or other media for use in electronic devices such as personal computer, digital camera, mobile phone, etc. In some implementations, the memory controller 106 is designed to operate in high duty cycle environments such as Solid State Disk (SSD) or embedded Multi-Media Card (eMMC), and SSDs or eMMCs is used as data storage for mobile devices such as smartphone, tablet computer, laptop computer, and enterprise storage array.

Memory controller 106 may be configured to control operations of memory device 104, e.g., read, erase and program operations. Memory controller 106 may also be configured to manage various functions related to data stored or to be stored in memory device 104, including but not limited to bad block management, garbage collection, logical address to physical address translation, wear leveling, etc. In some implementations, the memory controller 106 is further configured to process Error Checking and Correction (ECC) related to data read from or written to memory device 104. Memory controller 106 may also perform any other suitable functions, e.g., formatting memory device 104. Memory controller 106 may communicate with external devices (e.g., host 108 in FIG. 1) according to a particular communication protocol. Fox example, the memory controller 106 may also communicate with an external device through at least one of various interface protocols, such as USB protocol, MMC protocol, Peripheral Component Interconnect (PCI) protocol, Peripheral Component Interconnect Express (PCI-E) protocol, Advanced Technology Attachment (ATA) protocol, Serial ATA protocol, Parallel ATA protocol, Small Computer System Interface (SCSI) protocol, Enhanced Small Disk Interface (ESDI) protocol, Integrated Drive Electronics (IDE) protocol, Fire wire protocol, etc.

Figure 2B:
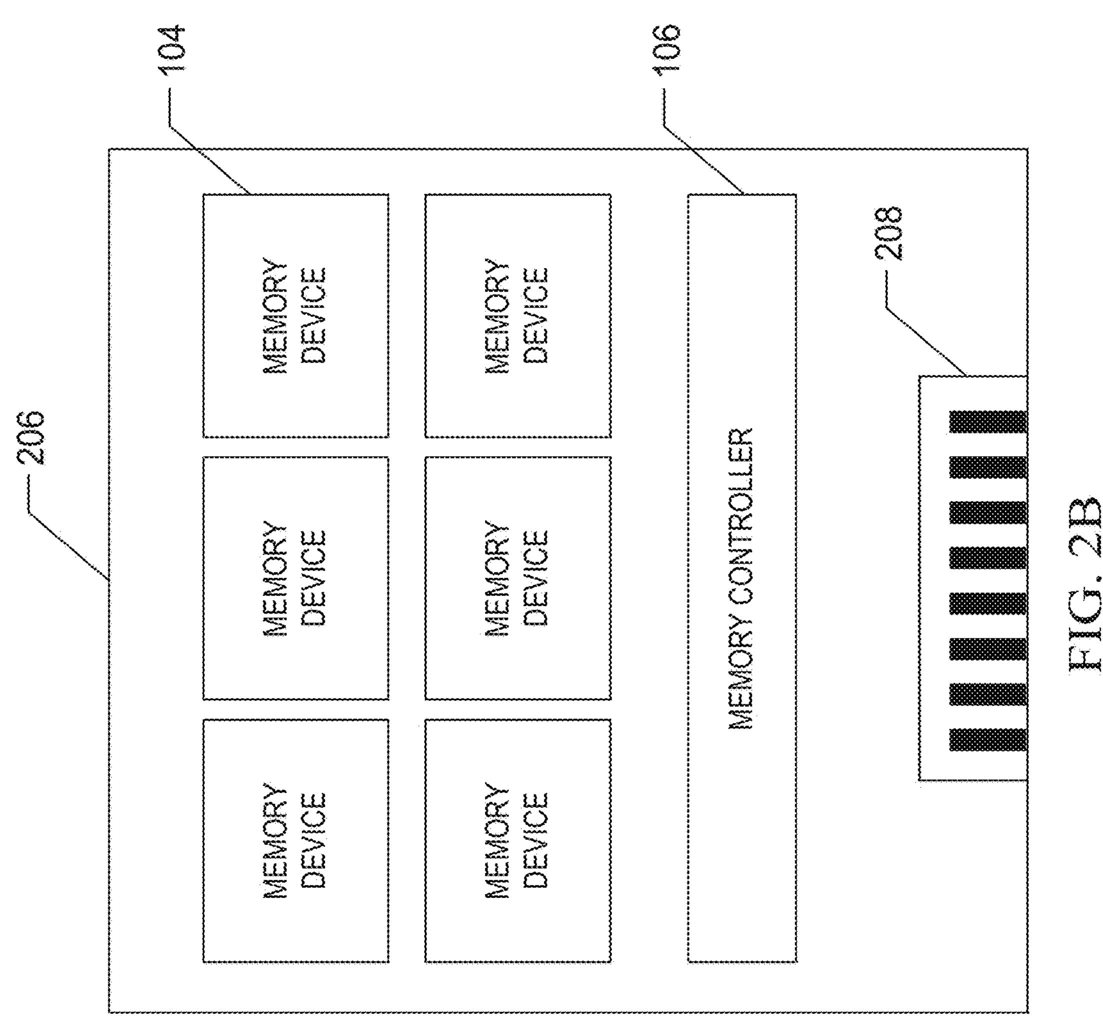
FIG. 2B is a schematic diagram of a solid-state drive shown according to an example of the present disclosure.
Figure 2A:
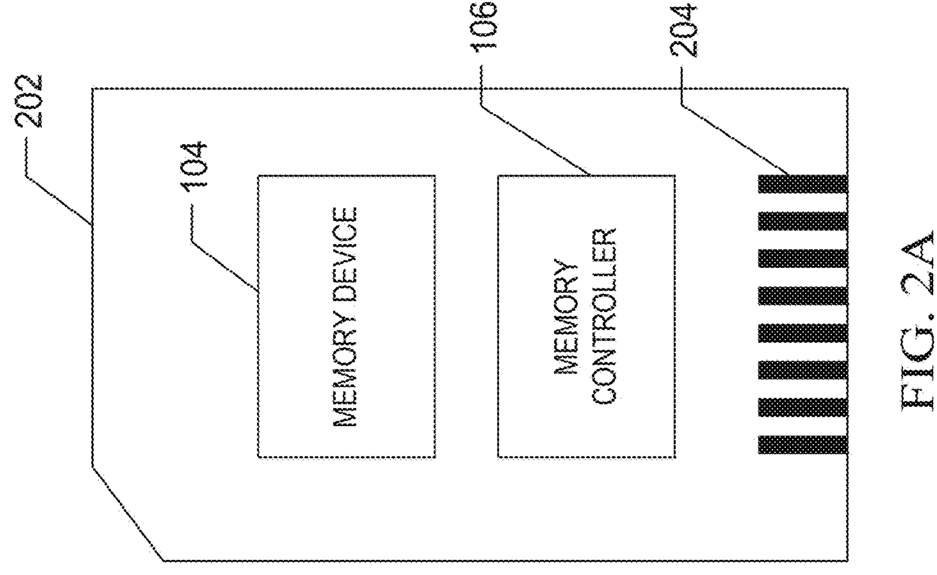
FIG. 2A is a schematic diagram of a memory card shown according to an example of the present disclosure.

The memory controller 106 and one or more memory devices 104 may be integrated into various types of storage devices, e.g., included in the same package (e.g., Universal Flash Storage (UFS) package or eMMC package). That is, memory system 102 may be implemented and packaged into different types of end electronic products. In one example as shown in FIG. 2A, memory controller 106 and a single memory device 104 may be integrated into a memory card 202. A memory card 202 may include a PC card (Personal Computer Memory Card), a CF card, a Smart Media (SM) card, a memory stick, a Multimedia card (MMC (Multi-Media Card), RS-MMC (Reduced-Size MMC), MMCmicro), a SD card (SD, miniSD, microSD, SDHC (Reduced-Size MMC)), UFS, etc. Memory card 202 may further include a memory card connector 204 coupling memory card 202 with a host (e.g., host 108 in FIG. 1). In another example as shown in FIG. 2B, memory controller 106 and multiple memory devices 104 may be integrated into a SSD 206. SSD 27 may further include an SSD connector 208 coupling SSD 206 with a host (e.g., host 108 in FIG. 1). In some implementations, at least one of the storage capacity or operating speed of SSD 206 is greater than the at least one of storage capacity or operating speed of memory card 202.

Figure 3:
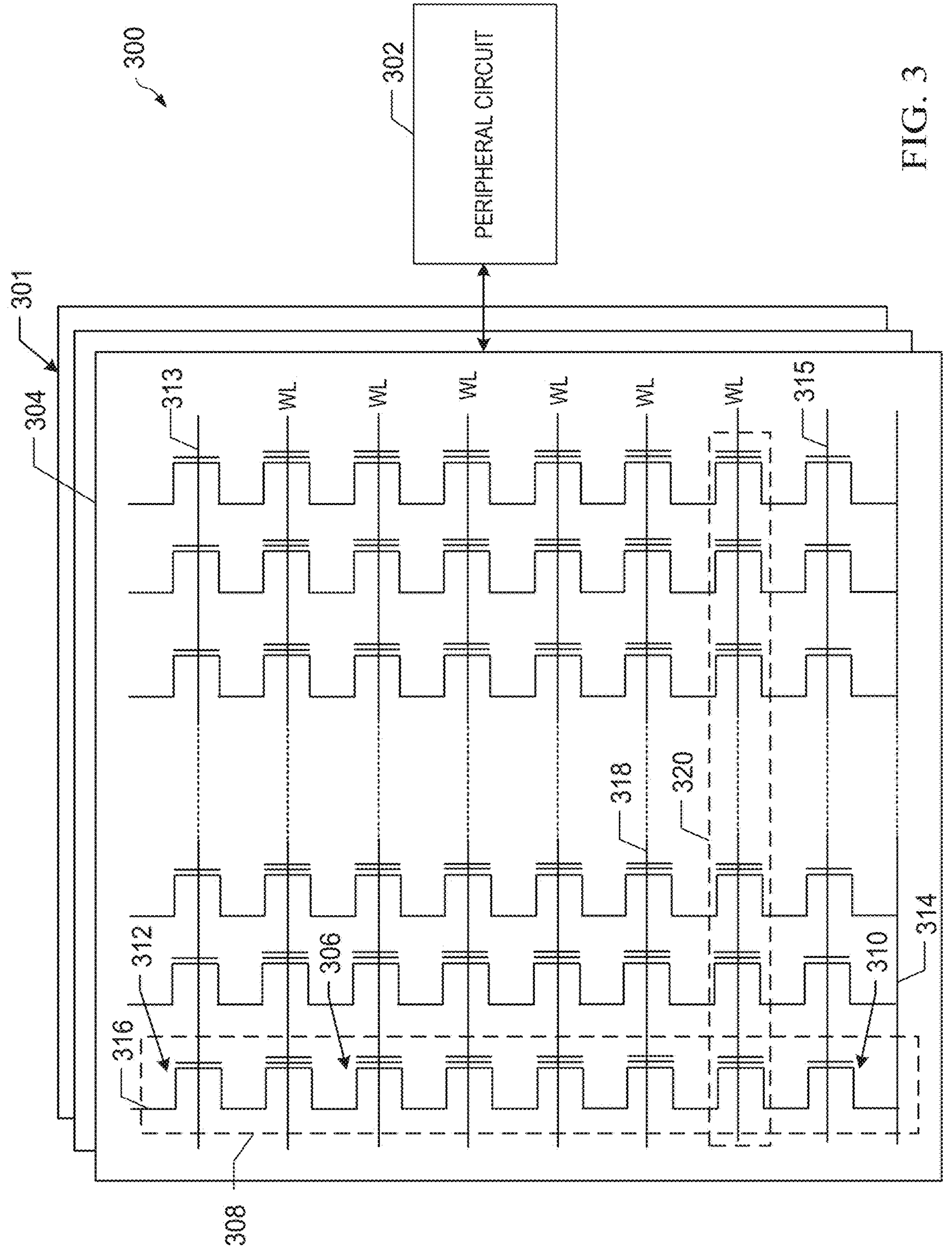
FIG. 3 is a schematic block diagram of a three-dimensional NAND memory device shown according to an example of the present disclosure.

FIG. 3 is a schematic block diagram of a three-dimensional NAND memory device 300 shown according to an example of the present disclosure. Memory device 300 may be an example of memory device 104 in FIG. 1. The memory device 300 may include a memory cell array 301 and a peripheral circuit 302 coupled to the memory cell array 301. Taking the memory cell array 301 being a three-dimensional NAND memory cell array as an example for illustration, where memory cells 306 are provided in an array of NAND memory strings 308, each NAND memory string extending vertically over a substrate (not shown). In some implementations, each NAND memory string 308 includes multiple memory cells 306 coupled in series and stacked vertically. Each memory cell 306 may retain a continuous analog value, e.g., voltage or charge, depending on the number of electrons trapped within the area of the memory cell 306. Each memory cell 306 may be a "floating gate" type memory cell including a floating gate transistor, or a "charge trap" type memory cell including a charge trap transistor.

In some implementations, each memory cell 306 is a Single Level Cell (SLC) that has two possible memory states and may thus store one bit of data. For example, a first memory state of "0" may correspond to a first voltage range, and a second memory state of "1" may correspond to a second voltage range. In some implementations, each memory cell 306 is a Multi Level Cell (MLC) capable of storing more than a single bit of data in more than four memory states. For example, an MLC may store two bits per cell, three bits per cell (also known as a Triple Level Cell (TLC)), or four bits per cell (also known as a Quad Level Cell (QLC)). Each MLC can be programmed to assume a range of possible nominal storage values. In an example, if each MLC stores two bits of data, the MLC may be programmed to write one of three possible nominal storage values into the cell, a fourth nominal storage value other than these three possible nominal storage values may be used for representing an erase state.

As shown in FIG. 3, each NAND memory string 308 may include a Bottom Select Gate (BSG) 310 at its source terminal and a Top Selective Gate (TSG) 312 at its drain terminal. BSG 310 and TSG 312 may be configured to activate the selected NAND memory string 308 during read operation and program operation. In some implementations, sources of the NAND memory string 308 in a same memory block 304 are coupled through a same Source Line (SL) 314 (e.g., a common SL). In other words, according to some implementations, all NAND memory strings 308 in a same memory block 304 have an Array Common Source (ACS). According to some implementations, the TSG 312 of each NAND memory string 308 is coupled to a corresponding bit line (BL) 316 from which data may be read or written via an output bus (not shown). In some implementations, each NAND memory string 308 is configured to be selected or deselected through applying a select voltage (e.g., above the threshold voltage of a transistor with a TSG 312) or a deselect voltage (e.g., 0V) to the corresponding TSG 312 via at least one of one or more TSG lines 313 or applying a select voltage (e.g., above the threshold voltage of a transistor with a BSG 310) or a deselect voltage (e.g., 0V) to the corresponding BSG 310 via one or more BSG lines 315.

As also shown in FIG. 3, NAND memory string 308 may be organized into multiple memory blocks 304 each of which may have a common source line 314 (e.g., coupled to ground). In some implementations, each memory block 304 is the basic data unit for an erase operation, e.g., all memory cells 306 on the same memory block 304 are erased simultaneously. To erase the memory cell 306 in the selected memory block, source line coupled to selected memory block and to unselected memory blocks in the same plane as selected memory block may be biased with an erase voltage (Vers) (e.g., a high positive voltage (e.g., 20V or higher)). It should be understood that, in some examples, erase operations may be performed at the half-memory block level, at the quarter-memory block level, or at a level with any suitable number of memory blocks or any suitable fraction of memory blocks. Memory cells 306 of adjacent NAND memory strings 308 may be coupled through a word line 318 that selects which row of memory cells 306 is affected by read and program operations. In some implementations, each word line 318 is coupled to a physical page in memory cells 306, the physical page is the basic data unit for program operations. The size of a physical page in bits may be related to the number of NAND memory strings 308 coupled through word line 318 in a memory block 304. Each word line 318 may include multiple control gates (gate electrodes) at each memory cell 306 in a corresponding physical page and a gate line coupling the control gates. A physical page includes multiple memory cells 306, the multiple memory cells are isolated by a upper selection gate isolation structure and a gate isolation structure, and multiple memory cells between the upper selection gate isolation structure and the gate isolation structure are arranged into multiple memory cell rows, and each memory cell row is parallel to the gate isolation structure and the upper selection gate isolation structure. Memory cells in a memory string sharing a same word line form a programmable (read/write) page.

Figure 4:
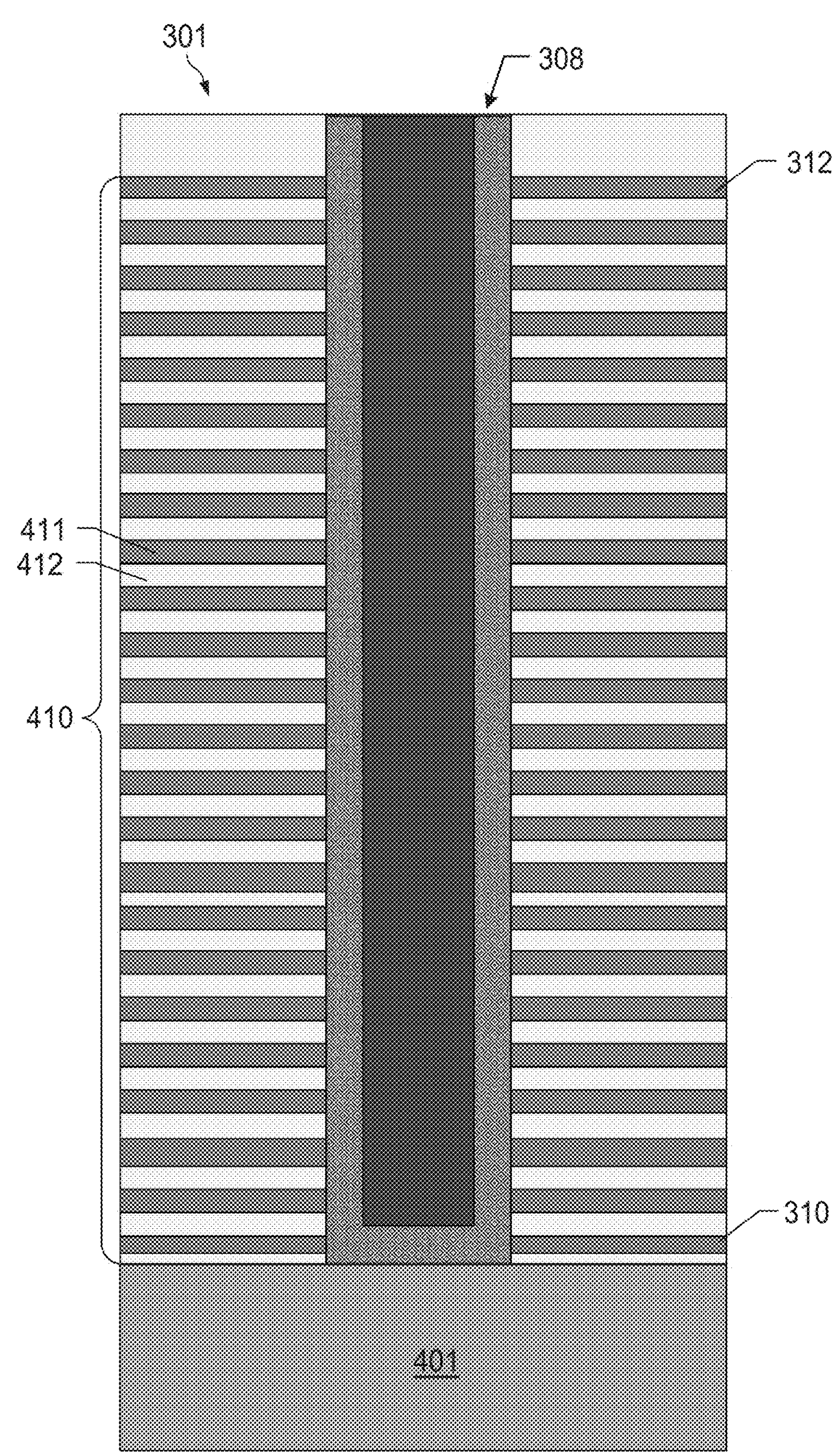
FIG. 4 is a schematic cross-sectional view of a memory device shown according to an example of the present disclosure.

FIG. 4 is a schematic cross-sectional view of a memory shown according to an example of the present disclosure. Referring to FIG. 4, the NAND memory string 308 may include a stacked structure 410, the stacked structure 410 includes multiple gate layers 411 and multiple insulating layers 412 alternately stacked in sequence, and NAND memory string 308 vertically penetrating through gate layers 411 and insulating layers 412. Gate layers 411 and the insulating layers 412 may be stacked alternately, and two adjacent gate layers 411 are separated by an insulating layer 412. The number of pairs of gate layer 411 and insulating layer 412 in the stacked structure 410 may determine the number of memory cells included in the memory cell array 301.

A constituent material of the gate layer 411 may include a conductive material. Conductive materials include, but are not limited to, tungsten (W), cobalt (Co), copper (Cu), aluminum (Al), polysilicon, doped silicon, silicide, or any combination thereof. In some examples, each gate layer 411 includes a metal layer, e.g., a tungsten layer. In some examples, each gate layer 411 includes a doped polysilicon layer. Each gate layer 411 may include a control gate surrounding a memory cell. A gate layer 411 at the top of a stacked structure 410 may extend laterally as an upper selection gate line, a gate layer 411 at the bottom of a stacked structure 410 may extend laterally as a lower selection gate line, and a gate layer 411 extending laterally between an upper selection gate line and a lower selection gate line may serve as a word line layer.

In some examples, a stacked structure 410 may be disposed on a semiconductor layer 401. The semiconductor layer 401 may include silicon (e.g., monocrystalline silicon), silicon germanium (SiGe), gallium arsenide (GaAs), germanium (Ge), silicon-on-insulator (SOI), germanium-on-insulator (GOI), or any other appropriate material.

In some examples, NAND memory string 308 includes a channel structure extending vertically through stacked structure 410. In some implementations, a channel structure includes a channel hole filled with semiconductor material(s) (e.g., as a semiconductor channel) and dielectric material(s) (e.g., as a memory film). In some implementations, a semiconductor channel includes silicon, e.g., polysilicon. In some implementations, a memory film is a composite dielectric layer including a tunneling layer, a storage layer (also referred to as a "charge trapping/storage layer"), and a blocking layer. A channel structure may have a cylindrical shape (e.g., a pillar shape). According to some implementations, a semiconductor channel, a tunneling layer, a storage layer and a blocking layer are radially arranged in this order from the center of the pillar toward the outer surface of the pillar. A tunneling layer may include silicon oxide, silicon oxynitride, or any combination thereof. A storage layer may include silicon nitride, silicon oxynitride, or any combination thereof. A barrier layer may include silicon oxide, silicon oxynitride, a high-k (high-k) dielectric, or any combination thereof. In an example, a memory film may include a composite layer of silicon oxide/silicon oxynitride/silicon oxide (ONO).

Figure 5:
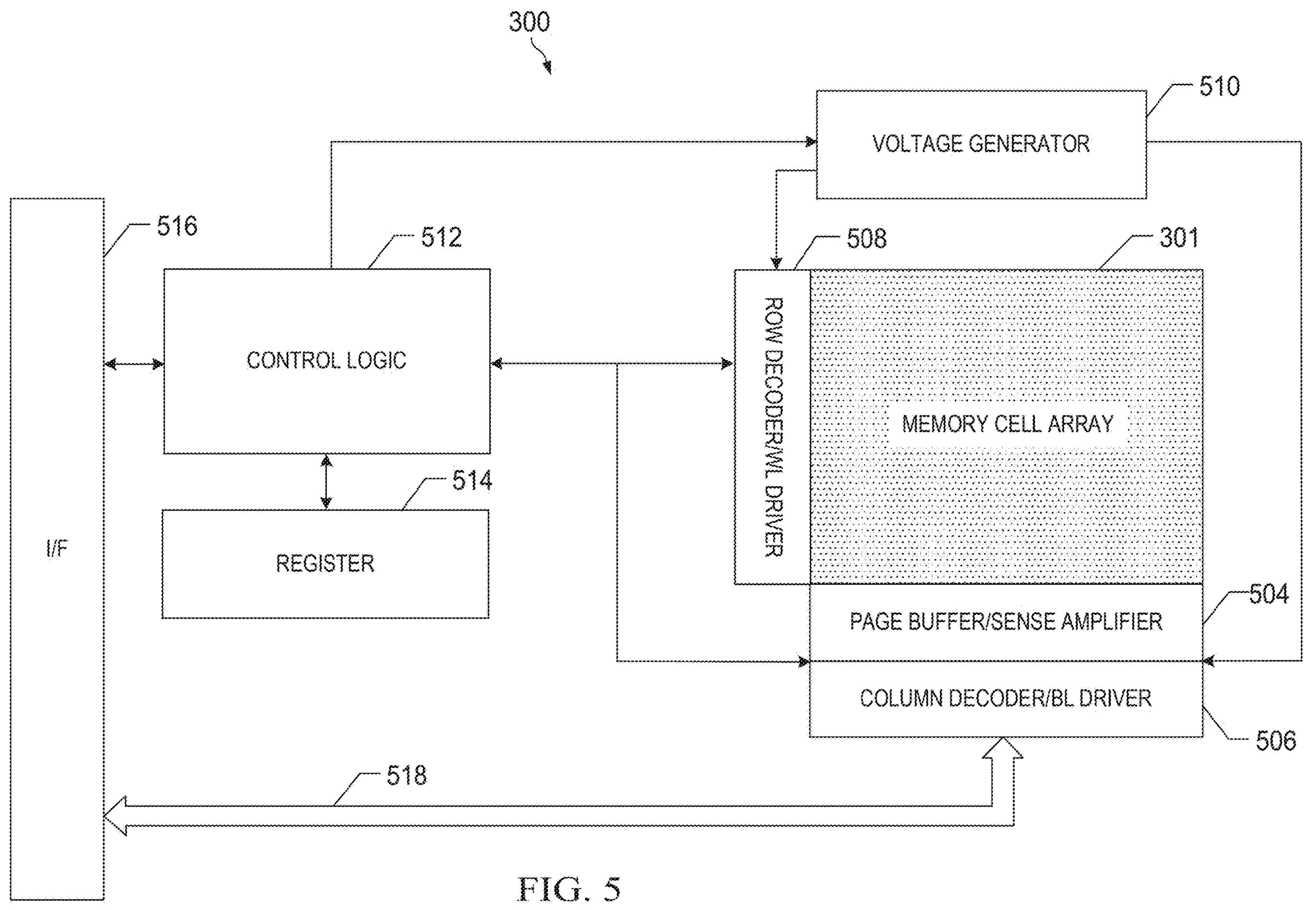
FIG. 5 is a schematic diagram of a memory device including an array of memory cells and peripheral circuits shown according to an example of the present disclosure.

Referring back to FIG. 3, the peripheral circuit 302 may be coupled to the memory cell array 301 through bit line 316, word line 318, source line 314, BSG line 315, and TSG line 313. The peripheral circuit 302 may include any suitable analog, digital, and mixed-signal circuitry for facilitating operation of the memory cell array 301 through applying at least one of a voltage signal or a current signal to and sensing at least one of voltage signal or current signal from each target memory cell 306 via bit line 316, word line 318, source line 314, BSG line 315, and TSG line 313. The peripheral circuit 302 may include various types of peripheral circuits formed with metal-oxide-semiconductor (MOS) technology. For example, FIG. 5 illustrates some example peripheral circuits, peripheral circuit 302 includes page buffer/sense amplifier 504, column decoder/bit line driver 506, row decoder/word line driver 508, voltage generator 510, control logic 512, register 514, interface 516 and data bus 518. In some examples, additional peripheral circuits not shown in FIG. 5 may also be included.

The page buffer/sense amplifier 504 may be configured to read data from and program (write) data to the memory cell array 301 according to control signals from the control logic 512. In one example, the page buffer/sense amplifier 504 may store programming data (written data) of a page to be programmed into one physical page 320 of the memory cell array 301. In another example, page buffer/sense amplifier 504 may perform a programming verify operation to ensure that data has been correctly programmed into memory cell 306 coupled to selected word line 318. In yet another example, page buffer/sense amplifier 504 may also sense a low power signal from bit line 316 representing a data bit stored in memory cell 306 and amplify a small voltage swing to a recognizable logic level during a read operation. The column decoder/bit line driver 506 may be configured to be controlled by control logic 512 and to select one or more NAND memory strings 308 through applying a bit line voltage generated from voltage generator 510.

The row decoder/word line driver 508 may be configured to be controlled by control logic 512 and select/deselect memory block 304 of memory cell array 301 and select/deselect word line 318 of memory block 304. The row decoder/word line driver 508 may also be configured to drive word line 318 with a word line voltage generated from voltage generator 510. In some implementations, the row decoder/word line driver 508 may also select/deselect and drive the BSG line 315 and the TSG line 313. As described in detail below, the row decoder/word line driver 508 is configured to perform programming operations on the memory cells 306 coupled to the selected word line 318. The voltage generator 510 may be configured to be controlled by the control logic 512, and generate word line voltage (e.g., read voltage, programming voltage, pass voltage, channel boost voltage, verify voltage, etc.), bit line voltage and source line voltage to be supplied to the memory cell array 301.

The control logic 512 may be coupled to each of the peripheral circuits described above and configured to control operations of each of the peripheral circuits. The register 514 may be coupled to the control logic 512 and include status register, command register and address register for storing status information, command operation code (OP code) and command address for controlling operations of each of the peripheral circuits. The interface 516 may be coupled to control logic 512 and act as a control buffer to buffer and relay control commands received from a host (not shown) to control logic 512 and to buffer and relay status information received from the control logic 512 to the host. Interface 516 may also be coupled to column decoder/bit line driver 506 via data bus 518 and act as a data I/O interface and data buffer to buffer and relay data to/from memory cell array 301.

Typically, a flash memory (e.g., memory device 104 in FIG. 1) relies on an operation of garbage collection to release space occupied by invalid data, and an operation of garbage collection may be performed by a memory controller (e.g., memory controller 106 in FIG. 1). In one example, at least one memory block is selected from multiple memory blocks as the source memory block (also referred to as an old memory block or a sacrifice block); the valid data in the selected source memory block is read, and the valid data which has been read is written into the target memory block (also referred to as a new memory block); the selected source memory block is erased to obtain an available memory block (also referred to as an idle block).

In some examples, the data stored in the memory block includes at least one of invalid data and valid data, where invalid data usually refers to junk data that has been deleted or overwritten, while valid data usually refers to data that is still used by users, and in practical applications, it may be determined whether the data is valid through looking up the Logical address To Physical address (L2P) table.

Usually, after determining the source memory block on which an operation of garbage collection requires to be performed, valid data is retrieved through the Page Table Entry Bitmap (PTE bitmap) associated with the source memory block, where the PTE bitmap is to identify whether a physical page in the source memory block stores data. For example, if data is stored on a certain physical page in the source memory block, the corresponding one bit in the PTE bitmap may be identified with one of the logical value "1" or "0". On the contrary, if no data is stored on a certain physical page in the source memory block, the corresponding one bit in the PTE bitmap may be identified with the other one of the logical value "1" or "0".

The memory controller may retrieve valid data according to the PTE bitmap and L2P table and read the valid data of the source memory block. For example, referring to FIG. 6, the memory controller may look up the Page Middle Directory (PMD) table according to the logical value "1" in the PTE bitmap to determine whether a valid mapping entry (L2P-PCA) exists; if a valid mapping entry exists, it is determined that the data of the physical page corresponding to the logical value "1" is valid data, and the page table entry (Page Table Entry, PTE) table is looked up to determine the physical address (Data-PCA) of the physical page which stores the valid data; the valid data in the memory block (Data (LCA: 1027)) is read through the physical address (Data-PCA). Of course, after the memory controller looks up the PMD table according to other logical values "1" in the PTE bitmap, in the case that it is determined that no valid mapping entry exists, it is determined that the data of the physical page corresponding to the other logical value "1" is invalid data.

In some examples, the memory controller may divide the L2P table into pages to form a multi-level page table, the multi-level page table includes the PMD table and PTE table described above. It may be understood that the L2P table may also include other page tables not shown in FIG. 6, e.g., Page Global Directory (PGD) table, Page Upper Directory (PUD) table, etc.

It may be understood that the logical value "1" in the PTE bitmap indicates that the data stored in the corresponding physical page may be valid data. Therefore, in order to avoid the loss of valid data, during performing the operation of garbage collection, the L2P table may be looked up once for each logical value "1" in the PTE bitmap, the greater the number of logical values "1" are, the more times the table may be looked up. However, when a large amount of data or quite random data is stored in the source memory block, more bits in the PTE bitmap will be set to the logical value "1", in one example, up to 4 KB bits in the PTE bitmap associated with a source memory block will be set to logical value "1", thus during garbage collection, the L2P table may be looked up multiple times, resulting in a time-consuming and inefficient garbage collection.

Figure 7:
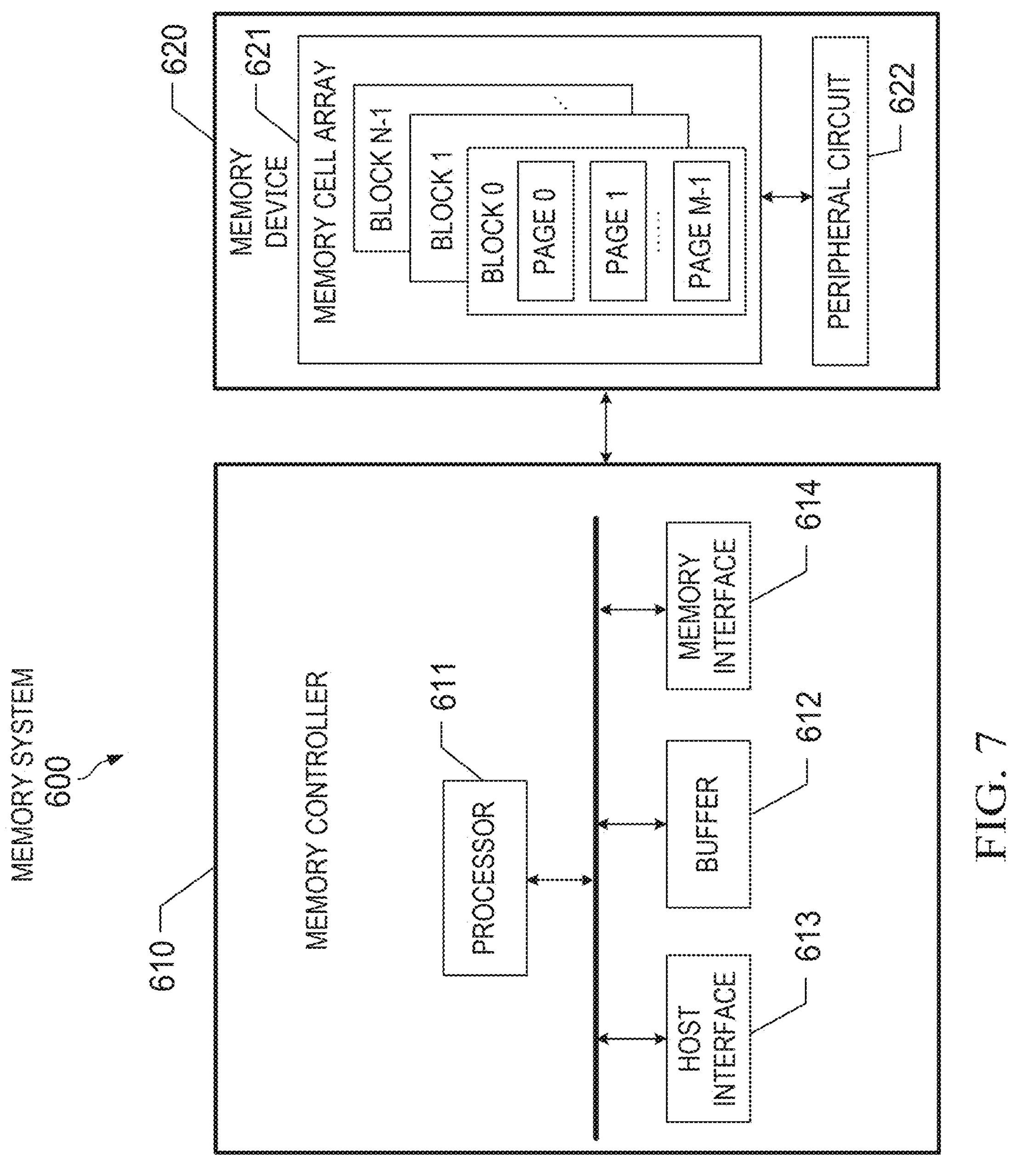
FIG. 7 is a schematic diagram of a memory system shown according to an example of the present disclosure.
Figure 8:
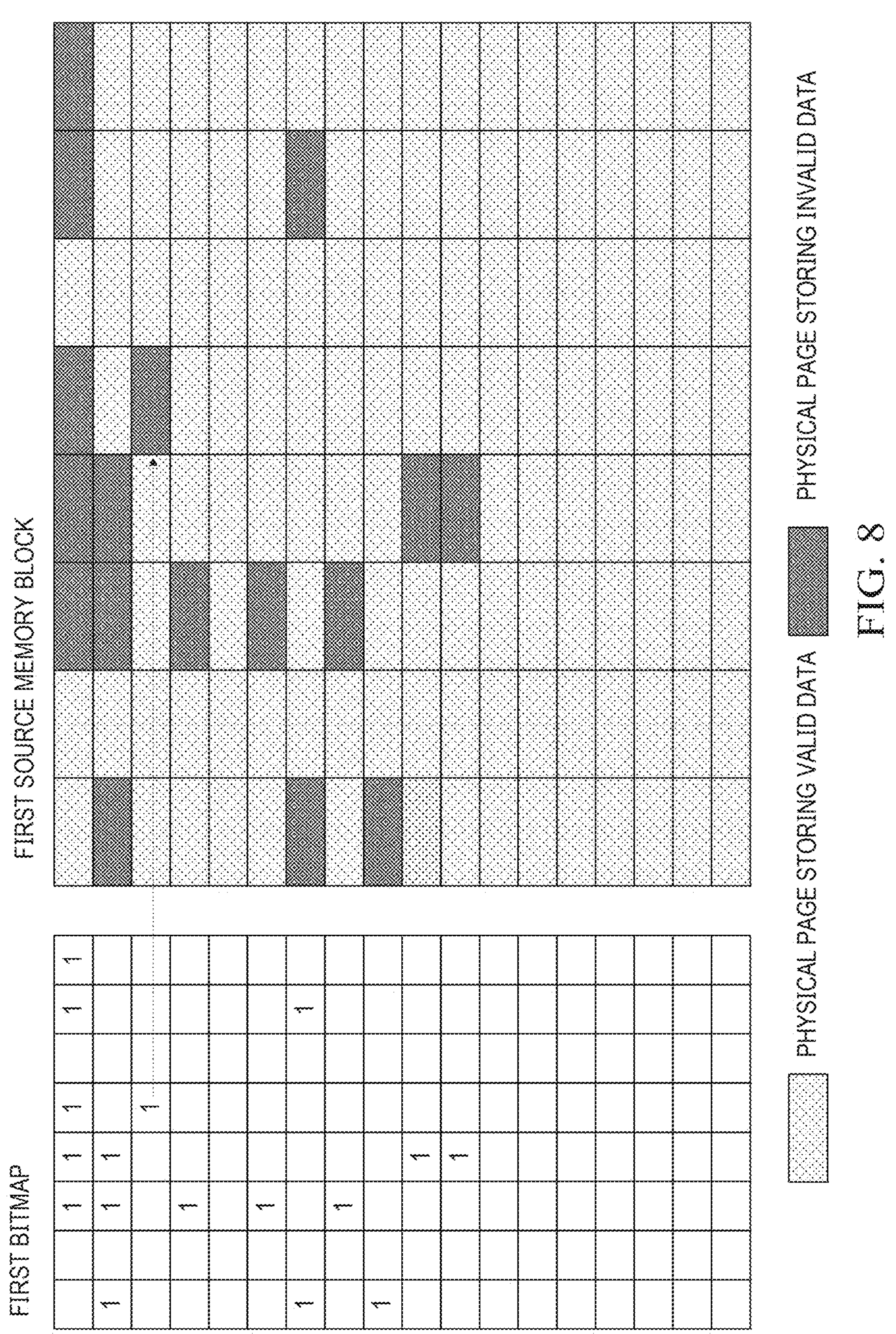
FIG. 8 is a schematic diagram of a first source memory block and a first bitmap shown according to an example of the present disclosure.
Figure 9:
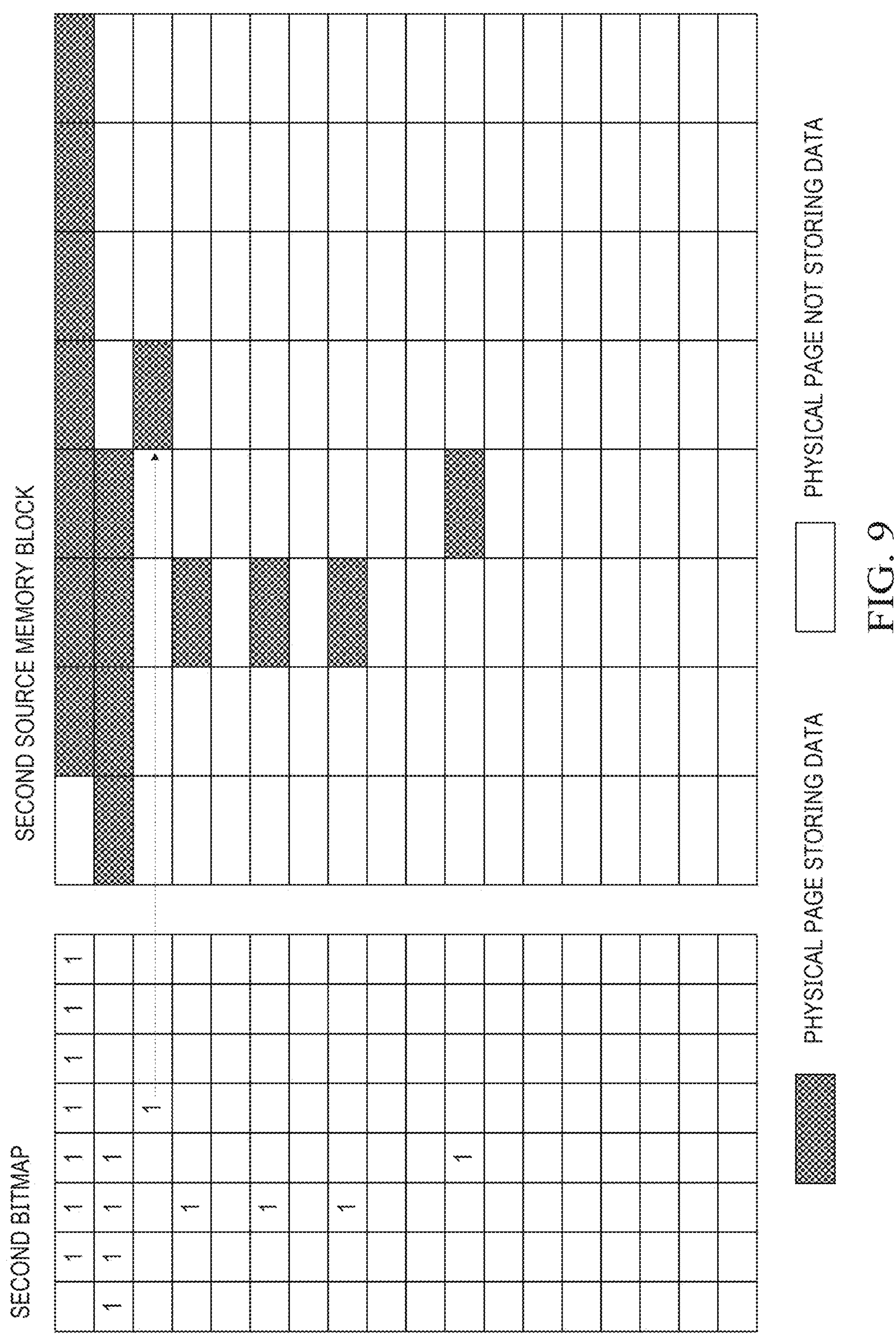
FIG. 9 is a schematic diagram of a second source memory block and a second bitmap shown according to an example of the present disclosure.

Based on one or more of the technical problems described above, an example of the present disclosure provides a memory system. FIG. 7 is a schematic diagram of a memory system shown according to an example of the present disclosure, FIG. 8 is a schematic diagram of a first source memory block and a first bitmap shown according to an example of the present disclosure, FIG. 9 is a schematic diagram of a second source memory block and a second bitmap shown according to an example of the present disclosure. The memory system provided by an example of the present disclosure will be in one example described below in conjunction with FIGS. 7 to 9.

Referring to FIG. 7, the memory system 600 includes a memory controller 610 and memory device 620 coupled to memory controller 610, the memory controller 610 and memory device 620 may be coupled in any suitable manner. The memory controller 610 includes a processor 611, a buffer 612, a host interface 613, a memory interface 614, etc. Of course, the memory controller 610 may also include other circuits or modules not shown.

In some examples, the host interface 613 outputs a request, data, etc., received from the host (e.g., host 108 in FIG. 1) to the internal bus, and sends data read from memory device 620, a response from processor 611, etc., to the host. The memory interface 614 controls the process of writing data and the like to the memory device 620 and the process of reading data from the memory device 620 based on instructions from the processor 611. The processor 611 controls the memory system 600 as a whole, the processor 611 is, e.g., a central processing unit, a Micro Processor Unit (MPU), etc. When receiving a request from the host via the host interface 613, the processor 611 performs control according to the request, e.g., the processor 611 instructs the memory interface 614 to write data to the memory device 620 according to a write request from the host. In addition, the processor 611 instructs the memory interface 614 to read data from the memory device 620 according to the read request from the host.

In some examples, the processor 611 may include multiple functional modules, and each functional module of the processor 611 may be a software module running on a processor (e.g., a microcontroller unit (MCU)) that is a part of processor 611, or may be a hardware module (e.g., an integrated circuit (IC, e.g., application specific IC (ASIC), field programmable gate array (FPGA), etc.)) of a finite state machine (FSM), or may be a combination of software modules and hardware modules.

In some examples, the memory controller 610 is configured to perform mapping management of data stored in the memory device 620, in one example, the memory controller 610 may update and store an L2P table, and each mapping entry in the L2P table may represent the mapping relationship between a logical address and a physical address. When the host sends a read request including a logical address to the memory controller 610, the memory controller 610 may obtain the corresponding physical address based on the L2P table and the logical address in the read request, and read data from the memory device 620 according to the physical address and send it to the host.

In some examples, the memory controller 610 includes a buffer 612, which may include but is not limited to a Static Random-Access Memory (SRAM), meanwhile, the memory system 600 also includes a memory for storing the L2P table, e.g., a Dynamic Random-Access Memory (DRAM), the memory controller 610 may quickly obtain the L2P table from the DRAM, thereby achieving a higher read efficiency, the DRAM may be disposed inside or outside the memory controller 610. Of course, in other examples, the L2P table may be stored in a three-dimensional NAND memory and loaded into the memory controller 610 when the memory system 600 is powered on.

The memory device 620 includes a memory cell array 621 and a peripheral circuit 622 coupled to the memory cell array 621, the memory cell array 621 includes multiple memory blocks, and the memory block includes multiple physical pages. In one example, FIG. 7 shows N memory blocks, respectively recorded as block0, block1, . . . block (N−1); each memory block may include m physical pages, respectively recorded as page0, page1, . . . page (m−1); where N and m are both integers greater than 1. The memory device 620 may include a three-dimensional NAND memory as shown in FIGS. 3 to 5, currently, three-dimensional NAND memory is mainly programmed (also referred to as write) in units of physical pages and erased in units of memory blocks.

In some examples, the memory controller 610 is configured to: determine at least one source memory block from the multiple memory blocks; in response to the bitmap type associated with a first source memory block from the at least one source memory block being a first bitmap, write valid data stored in the first source memory block into the first target memory block from the multiple memory blocks; where the first bitmap includes at least one first logical value, the first logical value is to identify a physical page which stores the valid data from the multiple physical pages in the memory block; the first target memory block is different from the source memory block; in response to the valid data being written into the first target memory block, erase the source memory block.

In this example, when performing an operation of garbage collection, the memory controller 610 may select at least one memory block from multiple memory blocks as a source memory block, and obtain a bitmap associated with the source memory block; when the bitmap type associated with the source memory block is the first bitmap, the memory controller 610 may look up the L2P table according to the first logical value in the first bitmap, determine the physical address of the physical page corresponding to the first logical value, and read the valid data stored in the physical page based on the physical address; and after writing the read valid data into the first target memory block, erase the first source memory block to obtain an available memory block.

In some examples, the memory controller 610 may classify and manage multiple memory blocks in the memory device 620. In one example, multiple memory blocks may be divided into an occupied block, an idle block, a bad block, etc., according to usage conditions, where an occupied block represents a memory block which stores data, an idle block represents a memory block that does not store data, and a bad block represents a memory block that may not be used normally. Here, an idle block may be an unused memory block or a memory block that may still be used normally after being erased. Therefore, when performing an operation of garbage collection, at least one occupied block may be selected from multiple occupied blocks as a source memory block, and an idle block may be selected from multiple idle blocks as a first target memory block, the first target memory block is to receive valid data from the source memory block. For case of understanding, the source memory block with a bitmap type of the first bitmap is recorded as the first source memory block.

The first bitmap may include multiple bits, and each bit may be set to a first logical value or a third logical value to identify whether the data stored in the corresponding physical page in the first source memory block is valid. For example, referring to FIG. 8, the first bitmap may include 144 bits, 127 bits of which are set to the first logical value, indicating that the data stored in the corresponding 127 physical pages is valid data; 17 bits are set to the third logical value, indicating that the data stored in the corresponding 17 physical pages is invalid data. The first logical value may be one of the logical values "1" or "0", and the third logical value may be the other one of the logical values "1" or "0", in this example, the first logical value is "0" and the third logical value is "1" for an example illustration, for the sake of simplicity, only the third logical value "1" is shown in FIG. 8, the first logic value "0" is not shown. Here, the number of bits, the number of first logical values, and the number of third logical values in the first bitmap are not limited to those shown in FIG. 8, and which may be set reasonably by those skilled in the art according to the actual situation.

It may be understood that all the data stored in the physical pages corresponding to all logical values "0" in the first bitmap is valid data. Therefore, when performing an operation of garbage collection, the memory controller 610 may directly determine the physical address of the physical page which stores valid data according to the number of logical values "0" in the first bitmap, without retrieving a valid mapping entry for the physical page corresponding to the logical value "0", thus, in a first aspect, the duration of garbage collection may be reduced and the efficiency of garbage collection may be improved; in a second aspect, when a large amount of data or quite random data is stored in the source memory block, by using the first bitmap provided by an example of the present disclosure, the efficiency of garbage collection may be greatly improved, which is more suitable for an application scenario where the amount of data is large or the data is quite random.

Here, performing an operation of garbage collection on the source memory block may be performed by firmware loaded in the memory controller 610, in one example, the firmware may be loaded to run on the processor 611 when powered on, and the valid data read from the first source memory block may be temporarily stored in the buffer 612 under the control of the processor 611. In an example, the firmware may be stored in the memory controller 610; in another example, the firmware may be stored in the memory device 620.

In some examples, operations of garbage collection include foreground garbage collection (Foreground GC, FGC) and background garbage collection (Background GC, BGC). When the available storage space in the memory device 620 is less than the total amount of written data, the memory controller 610 may perform garbage collection on the memory device 620 to release enough storage space for data writing, the garbage collection at this time is a passive way, which is referred to as foreground garbage collection; and when the memory controller 610 is in an idle state, the memory controller 610 actively performs garbage collection on the memory device 620 to release more storage space, and the garbage collection at this time is an active way, which is referred to as background garbage collection. The technical solution provided by the example of the present disclosure may be implemented in at least one process of foreground garbage collection and background garbage collection to ensure that there is sufficient storage space in the memory device 620 to store data. In an example, the operation of garbage collection may be foreground garbage collection, and due to the reduction of the duration of garbage collection, write timeout (write timeout) may be avoided.

In some examples, the memory controller 610 is further configured to: in response to the bitmap type associated with a second source memory block from the at least one source memory block being a second bitmap, determine a physical page which stores data in the second source memory block; where the second bitmap includes at least one second logical value, the second logical value is to identify a physical page which stores data from the multiple physical pages in the memory block; the second logical value is different from a numeric value of the first logical value; in response to the logical address to physical address mapping table, determine whether the data stored in the physical page which stores data in the second source memory block is valid; in response to the data stored in the physical page which stores data in the second source memory block being valid, write the valid data stored in the second source memory block into the first target memory block.

In this example, when the bitmap type associated with the source memory block is the second bitmap, the memory controller 610 may look up the L2P table according to the second logical value in the second bitmap to determine whether a valid mapping entry for the physical page corresponding to the second logical value exists; if a valid mapping entry exists, the physical address of the physical page corresponding to the second logical value is determined, and the valid data stored in the physical page is read based on the physical address; and after the read valid data is written into the first target memory block, the second source memory block is erased to obtain an available memory block. For case of understanding, the source memory block with a bitmap type of the second bitmap is recorded as the second source memory block.

The second bitmap may include multiple bits, and each bit may be set to a second logical value or a fourth logical value to identify whether the corresponding physical page in the second source memory block stores data. For example, referring to FIG. 9, the second bitmap may include 144 bits, 16 bits of which are set to the second logical value, indicating that the corresponding 16 physical pages store data; 128 bits are set to the third logical value, indicating that the corresponding 128 physical pages do not store data. The second logical value may be one of the logical values “1” or “0”, and the fourth logical value may be the other one of the logical values “1” or “0”, in this example, the second logical value is “1” and the fourth logical value is “0” for an example illustration, for the sake of simplicity, only the second logical value “1” is shown in FIG. 9, the fourth logic value “0” is not shown. Here, the number of bits, the number of second logical values, and the number of fourth logical values in the second bitmap are not limited to those shown in FIG. 9, and which may be set reasonably by those skilled in the art according to the actual situation.

It may be understood that the data stored in the physical pages corresponding to all logical values “1” in the second bitmap may be valid data. Therefore, when performing an operation of garbage collection, the memory controller 610 may retrieve whether a valid mapping entry for the physical page corresponding to the logical value “1” in the second bitmap exists to avoid the loss of valid data.

Figure 6:
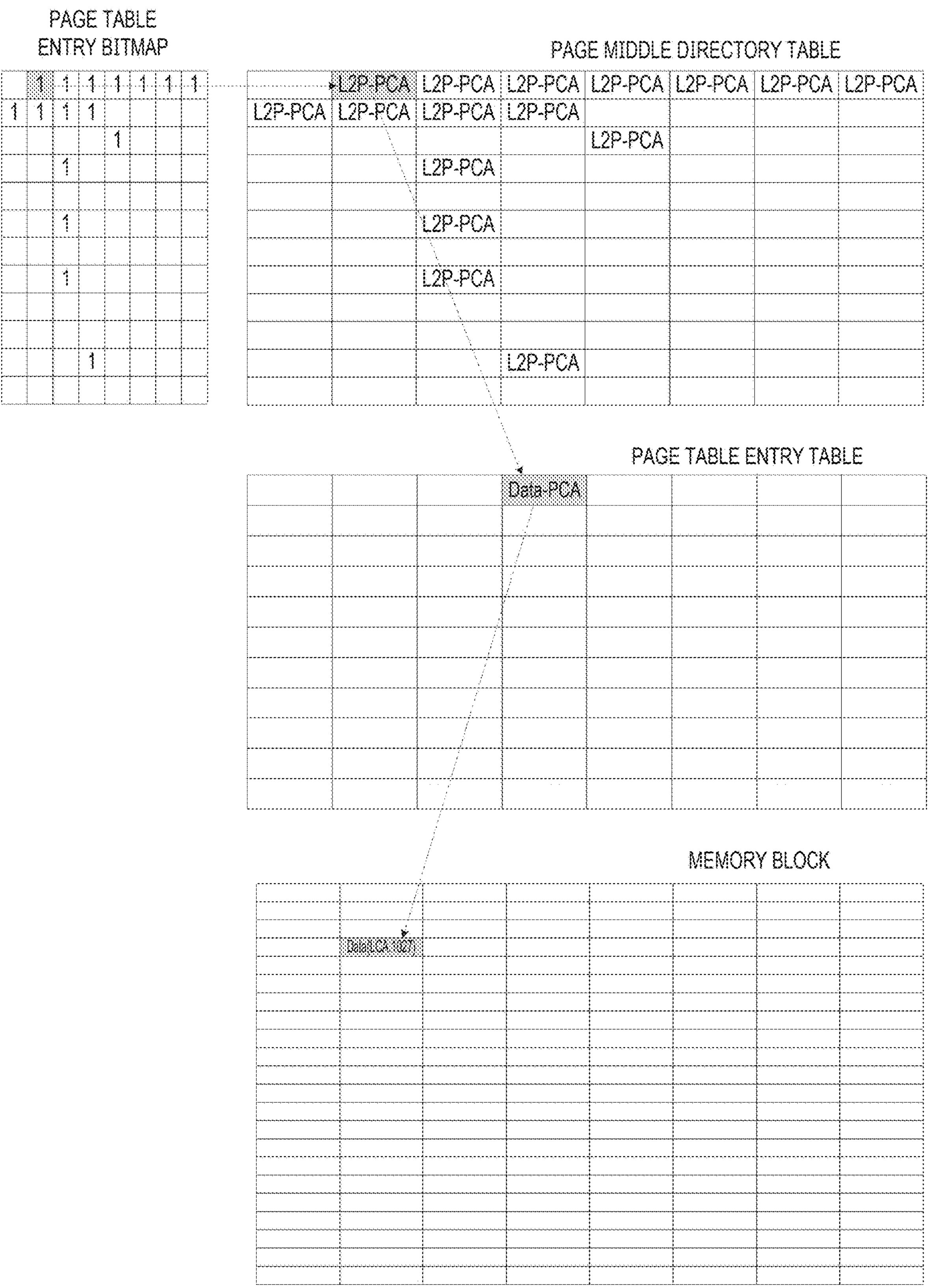
FIG. 6 is a schematic diagram of an operation of garbage collection shown according to an example of the present disclosure.

In actual applications, the degree of randomness of data stored in different source memory blocks may vary, and if all source memory blocks on which garbage collection need to be performed are identified by a single bitmap, e.g., all source memory blocks are identified by the page table entry bitmap shown in FIG. 6, for source memory blocks with high data randomness, the number of “1”s in the associated page table entry bitmap is more, which means that the L2P table may be looked up more times, resulting in longer time consumption for garbage collection; as another example, all source memory blocks employ the first bitmap shown in FIG. 8, for source memory blocks with low data randomness, the number of “1”s in the associated first bitmap is more, which means that the bits of the first bitmap are set to “1” more times and the space occupied by the first bitmap increases, resulting in increased firmware overhead and occupied storage space.

Therefore, in examples of the present disclosure, taking into account the differences between different source memory blocks, different types of bitmaps are designed, e.g., for source memory blocks with a higher degree of randomness, the first bitmap may be used for identification; for source memory blocks with a lower degree of randomness, the second bitmap may be used for identification. Thus, the flexibility of bitmap design in the memory system is increased. It may be understood that when the randomness of the source memory block is high, the operation of garbage collection is more efficient based on the first bitmap; when the randomness of the source memory block is low, the operation of garbage collection is more efficient based on the second bitmap, those skilled in the art may make reasonable settings according to the actual situation, and the present disclosure has no special limitation on this.

In some examples, the memory controller 610 is further configured to: determine whether the bitmap type associated with the source memory block is the first bitmap or the second bitmap. For example, the memory controller 610 may generate different identification bits to record the types of different bitmaps, e.g., the memory controller 610 may generate a first identification bit, and the first identification bit is to indicate the bitmap type of the first bitmap; the memory controller 610 may also generate a second identification bit, the second identification bit is to indicate the bitmap type of the second bitmap, and the second identification bit is different from the first identification bit.

In some examples, the first identification bit and the second identification bit may be represented with different logical values. For example, the first identification bit may be one of the logical values “1” or “0”, and the second identification bit may be the other one of the logical values “1” or “0”, which is not specially limited in the present disclosure.

In the example of the present disclosure, by generating different identification bits, whether the type of bitmap is the first bitmap or the second bitmap may be identified, and by obtaining the identification bit of the bitmap associated with the source memory block, the bitmap type associated with the source memory block may be determined, thereby performing corresponding operation of garbage collection processing, thereby facilitating to improving the efficiency of garbage collection.

In some examples, the memory controller 610 is configured to: in response to the first write command, writing the data of the first logical page indicated by the first write command into an initial source memory block from the multiple memory blocks; where, the initial source memory block is different from the first target memory block; in response to the data of the first logical page being written into the initial source memory block, update an initial bitmap associated with the initial source memory block; where the initial bitmap includes the first bitmap and the second bitmap; in response to the updated initial bitmap, determine the number of physical pages which store valid data in the initial source memory block; where the physical page which stores valid data in the initial source memory block includes a physical page which stores the data of the first logical page; in response to the number of physical pages which store valid data in the initial source memory block being greater than a preset threshold, store the first bitmap in the memory device 620.

In one example, the memory controller 610 may generate a first write signal in response to the first write command, and send the first write signal and the data of the first logical page to the memory device 620 through the memory interface 614, the peripheral circuit 622 may write data of a first logical page into the memory cell array 621 in response to the first write signal, e.g., writing into at least one physical page in the initial source memory block. Here, the first write command includes at least one of a sequential write command and a random write command.

After writing the data of the first logical page into the initial source memory block, the processor 611 may update the L2P table and the initial bitmap associated with the initial source memory block, e.g., for the physical page into which the data of the logical page is written, the corresponding bits in the first bitmap and the second bitmap are updated to a logical value “1”. It may be understood that the more physical pages into which the data of the logical page is written are, the greater the number of logical values “1” in the first bitmap and the second bitmap is. In practical applications, the processor 611 may generate an initial bitmap associated with the initial source memory block when data is first written into the initial source memory block, and update the initial bitmap after data is written into the initial source memory block.

After updating the initial bitmap, the processor 611 may count the number of logical values "1" in the first bitmap, thereby determining the number of physical pages which store valid data in the initial source memory block; and when the number of logic values "1" in the first bitmap is greater than the preset threshold, all bits in the first bitmap may be set to logic values "0" (e.g., the first logic value), and then the first bitmap is stored in the memory device 620. Here, the processor 611 may initialize the first bitmap (e.g., reset the first bitmap) when the number of logical values "1" in the first bitmap is greater than the preset threshold. Of course, in other examples, the processor 611 may also count the number of logical values "1" in the second bitmap, thereby determining the number of physical pages which store valid data in the initial source memory block.

It may be understood that in an example of the present disclosure, when writing data into the initial source memory block, two different types of bitmaps may be generated, and in the case that the number of physical pages which store valid data in the initial source memory block exceeds the preset threshold, the second bitmap may be deleted and only the first bitmap may be retained, and the first bitmap may be stored in the memory device 620, since the first logical value in the first bitmap is to identify the physical page which stores valid data in the associated memory block, thus when the initial source memory block corresponding to the first bitmap is selected as the source memory block, the efficiency of garbage collection of source memory blocks with a high degree of randomness may be improved.

In some examples, the memory controller 610 is further configured to: in response to the number of physical pages which store valid data in the initial source memory block being less than or equal to the preset threshold, store the second bitmap in the memory device 620. As described in the above example, when it is determined that the number of physical pages which store valid data in the initial source memory block is less than or equal to the preset threshold, the second bitmap may be stored in the memory device 620. Here, the logic value "1" in the second bitmap is the second logic value described above.

It may be understood that in an example of the present disclosure, in the case that the number of physical pages which store valid data in the initial source memory block does not exceed the preset threshold, the first bitmap may be deleted and only the second bitmap may be retained, and the second bitmap may be stored in the memory device 620, since the number of the second logical value in the second bitmap is small, thus when the initial source memory block corresponding to the second bitmap is selected as the source memory block, the efficiency of garbage collection for source memory blocks with a low degree of randomness may be improved.

In some examples, the preset threshold may be reasonably set according to the capacity of the memory block, and the present disclosure has no special limitations on this. In an example, the preset threshold is 70% of the total number of multiple physical pages in the memory block, that is, when the number of physical pages which store valid data exceeds 70% of the total number of multiple physical pages, the bitmap associated with this memory block is set as the first bitmap.

In some examples, the memory controller 610 is further configured to: in response to the first bitmap being stored in the memory device 620, generate a first identification bit, and store the first identification bit in the memory device 620; in response to the second bitmap being stored in the memory device 620, generate a second identification bit, and store the second identification bit in the memory device 620.

In an example of the present disclosure, after the first bitmap is stored in the memory device 620, a corresponding first identification bit may be generated, and the first identification bit is to indicate the bitmap type of the first bitmap. Thus, when selecting the memory block corresponding to the first bitmap as the source memory block, the processor 611 may determine that the bitmap associated with the memory block is the first bitmap through obtaining the corresponding first identification bit, and in turn perform the corresponding operation of garbage collection. The operation of garbage collection process of the memory block corresponding to the first bitmap has been described in the above example and will not be repeated here.

In an example of the present disclosure, after the second bitmap is stored in the memory device, a corresponding second identification bit may be generated, and the second identification bit is to indicate the bitmap type of the second bitmap, thus, when selecting the memory block corresponding to the second bitmap as the source memory block, the processor may determine that the bitmap associated with the memory block is the second bitmap through obtaining the corresponding second identification bit, and in turn perform the corresponding operation of garbage collection. The operation of garbage collection process of the memory block corresponding to the second bitmap has been described in the above example and will not be repeated here.

In addition, in an example of the present disclosure, through saving at least one of the first identification bit and the second identification bit into the memory device, the loss of the information of the first identification bit and the second identification bit may be avoided.

In some examples, the memory controller 610 is configured to: select at least one initial source memory block from a plurality of or multiple of the initial source memory blocks as the source memory block. In one example, the operation of garbage collection is based on the Greedy Algorithm. In one example, an initial source memory block storing less valid data is selected as the source memory block, such that the time for reading valid data from the source memory block may be reduced, thereby improving the efficiency of garbage collection. In practical applications, the algorithm for selecting a source memory block from a plurality of or multiple of the initial source memory blocks is not limited to this, and may also be other algorithms known in the art.

It may be understood that since the first logical value in the first bitmap is to identify the physical page which stores valid data. Therefore, when selecting the source memory block from the initial source memory blocks corresponding to the first bitmap, the initial source memory block corresponding to the first bitmap with a smaller number of first logical values may be directly selected, thereby further reducing the time duration of garbage collection and improving the efficiency of garbage collection.

In some examples, the memory controller 610 is configured to: in response to the second write command following the first write command, write the data of the second logical page indicated by the second write command into a second target memory block from the multiple memory blocks; where, the second target memory block is different from the first target memory block; in response to the data of the second logical page being written into the second target memory block, update the logical address to physical address mapping table; in response to the updated logical address to physical address mapping table, determine whether the data of the first logical page is overwritten; in response to the data of the first logical page being overwritten, determine a bitmap type associated with the initial source memory block in which the overwritten data of the first logical page is located; in response to the bitmap type associated with the overwritten initial source memory block being the first bitmap, update the first bitmap; in response to the bitmap type associated with the overwritten initial source memory block being the second bitmap, keep the second bitmap to be unchanged.

In one example, the memory controller 610 may generate a second write signal in response to the second write command, and send the second write signal and the data of the second logical page to the memory device 620 through the memory interface 614, the peripheral circuit 622 may write data of a second logical page into the memory cell array 621 in response to the second write signal, e.g., writing into at least one physical page in the second target memory block. Here, the second write command includes at least one of a sequential write command and a random write command, the second target memory block may be at least one of an occupied block or a blank block, in the case where the second target memory block is an occupied block, at least part of the data of the second logical page may be written into a blank physical page in the occupied block, that is, a physical page that does not store data.

After writing the data of the second logical page into the second target memory block, the processor 611 may update the L2P table and determine whether the data of the first logical page is overwritten based on the updated L2P table; in the case where the data of the first logical page is overwritten, the processor 611 determines the bitmap type associated with the initial source memory block in which the overwritten data of the first logical page is located based on the obtained identification bit, e.g., if the processor 611 obtains the first identification bit, it updates the first bitmap associated with the initial source memory block; and if the processor 611 obtains the second identification bit, the second bitmap associated with the initial source memory block keeps unchanged.

In some examples, the updated L2P table records the mapping entry between the physical address and the logical address of the data of the second logical page, and the physical address of the data of the second logical page may be determined by looking up the updated L2P table. When writing the data of the second logical page, if the logical address of the data of the second logical page is consistent with the logical address of the data of the first logical page, this case is data overwriting, and the data of the second logical page will not overwrite the overwritten data of the first logical page, but will be written into other physical pages, the overwritten data of the first logical page will be labeled as garbage data (also referred to as invalid data). Therefore, through looking up the updated L2P table, it may be determined whether the data of the first logical page has been overwritten.

In some examples, the first bitmap further includes at least one third logical value, the third logical value is to identify a physical page which stores invalid data from the multiple physical pages in the memory block, the third logical value is different from the numerical value of the first logical value; In one example, the memory controller 610 is configured to: in response to the bitmap associated with the overwritten initial source memory block being the first bitmap, adjust the target first logical value in the first bitmap to be the third logical value; where, the target first logical value is to identify the physical page in which the data of the first logical page being overwritten is located. For example, if the physical page in the initial source memory block is overwritten, the bit corresponding to the overwritten physical page in the first bitmap is adjusted from the logical value "0" to the logical value "1" to indicate that the data stored in this physical page becomes invalid data.

A memory system is provided by an example of the present disclosure, the memory system includes a memory controller and a memory device coupled to the memory controller; the memory device includes multiple memory blocks, the memory block includes multiple physical pages, and the memory controller is configured to: determine at least one source memory block from the multiple memory blocks; in response to the bitmap type associated with a first source memory block from the at least one source memory block being a first bitmap, write valid data stored in the first source memory block into the first target memory block from the multiple memory blocks; where the first bitmap includes at least one first logical value, the first logical value is to identify a physical page which stores the valid data from the multiple physical pages in the memory block; the first target memory block is different from the source memory block; in response to the valid data being written into the first target memory block, erase the source memory block. Thus, in a first aspect, when performing an operation of garbage collection, the physical address of the physical page which stores valid data may be directly determined according to the number of first logical values, without retrieving a valid mapping entry for the physical page corresponding to the first logical value, thus, in a first aspect, the duration of garbage collection may be reduced and the efficiency of garbage collection may be improved; in a second aspect, when a large amount of data or quite random data is stored in the source memory block, by using the first bitmap provided by an example of the present disclosure, the efficiency of garbage collection may be greatly improved, which is more suitable for an application scenario where the amount of data is large or the data is quite random.

Based on the memory system described above, an example of the present disclosure provides a method of operating a memory system.

Figure 10:
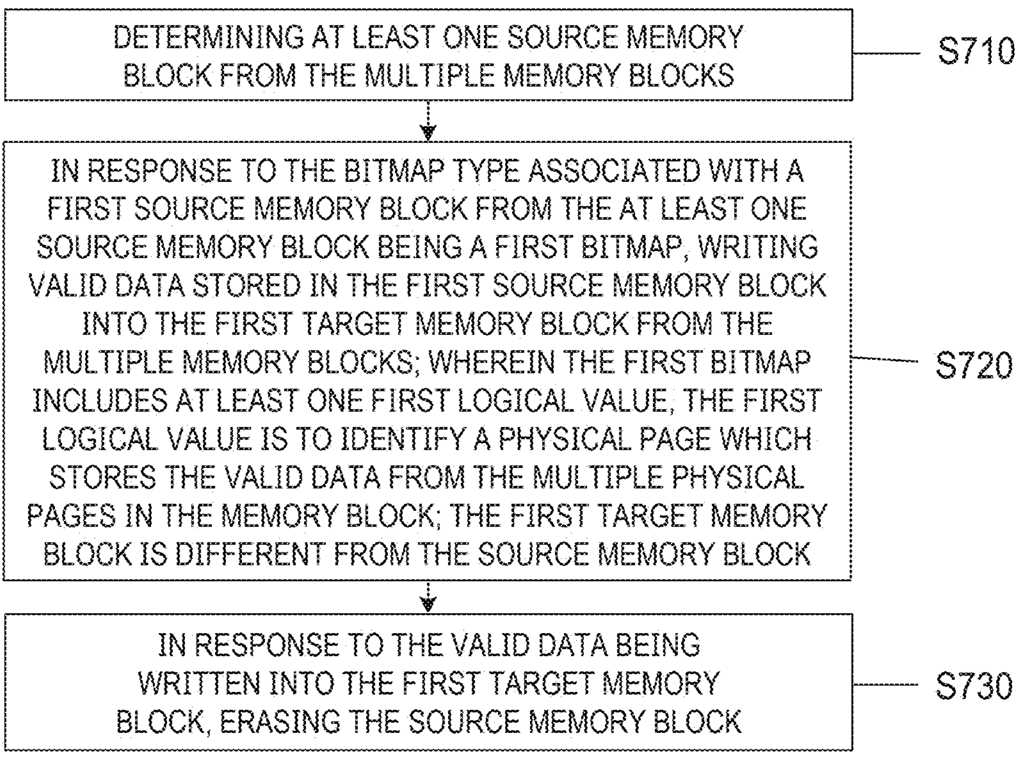
FIG. 10 is a flowchart of a method of operating a memory system shown according to an example of the present disclosure.

FIG. 10 is a flowchart of a method of operating a memory system shown according to an example of the present disclosure. The operating method includes at least the following operations:

S710: determining at least one source memory block from the multiple memory blocks;

S720: in response to the bitmap type associated with a first source memory block from the at least one source memory block being a first bitmap, writing valid data stored in the first source memory block into the first target memory block from the multiple memory blocks; where the first bitmap includes at least one first logical value, the first logical value is to identify a physical page which stores the valid data from the multiple physical pages in the memory block; the first target memory block is different from the source memory block;

S730: in response to the valid data being written into the first target memory block, erasing the source memory block.

In some examples, the operating method described above further includes: in response to the bitmap type associated with a second source memory block from the at least one source memory block being a second bitmap, determining a physical page which stores data in the second source memory block; where the second bitmap includes at least one second logical value, the second logical value is to identify a physical page which stores data from the multiple physical pages in the memory block; the second logical value is different from the first logical value; in response to the logical address to physical address mapping table, determining whether the data stored in the physical page which stores data in the second source memory block is valid; in response to the data stored in the physical page which stores data in the second source memory block being valid, writing the valid data stored in the second source memory block into the first target memory block.

In some examples, the operating method described above further includes: determining whether the bitmap type associated with the source memory block is the first bitmap or the second bitmap.

In some examples, the operating method described above further includes: in response to the first write command, writing the data of the first logical page indicated by the first write command into an initial source memory block from the multiple memory blocks; where, the initial source memory block is different from the first target memory block; in response to the data of the first logical page being written into the initial source memory block, update an initial bitmap associated with the initial source memory block; where the initial bitmap includes the first bitmap and the second bitmap; in response to the updated initial bitmap, determining the number of physical pages which store valid data in the initial source memory block; where the physical page which stores valid data in the initial source memory block includes a physical page which stores the data of the first logical page; in response to the number of physical pages which store valid data in the initial source memory block being greater than a preset threshold, storing the first bitmap in the memory device.

In some examples, the operating method described above further includes: in response to the number of physical pages which store valid data in the initial source memory block being less than or equal to the preset threshold, storing the second bitmap in the memory device.

In some examples, the method described above further includes: in response to the first bitmap being stored in the memory device, generating a first identification bit, and storing the first identification bit in the memory device; where the first identification bit is to indicate the bitmap type of the first bitmap; in response to the second bitmap being stored in the memory device, generating a second identification bit, and storing the second identification bit in the memory device; where the second identification bit is to indicate the bitmap type of the second bitmap, the second identification bit is different from the first identification bit.

In some examples, the determine at least one source memory block from the multiple memory blocks described above includes: selecting at least one initial source memory block from a plurality of or multiple of the initial source memory blocks as the source memory block.

In some examples, the operating method described above further includes: in response to the second write command following the first write command, writing the data of the second logical page indicated by the second write command into a second target memory block from the multiple memory blocks; where, the second target memory block is different from the first target memory block; in response to the data of the second logical page being written into the second target memory block, updating the logical address to physical address mapping table; in response to the updated logical address to physical address mapping table, determining whether the data of the first logical page is overwritten; in response to the data of the first logical page being overwritten, determining a bitmap type associated with the initial source memory block in which the overwritten data of the first logical page is located; in response to the bitmap type associated with the overwritten initial source memory block being the first bitmap, updating the first bitmap.

In some examples, the operating method described above further includes: in response to the bitmap type associated with the overwritten initial source memory block being the second bitmap, keeping the second bitmap to be unchanged.

In some examples, the first bitmap further includes at least one third logical value, the third logical value is to identify a physical page which stores invalid data from the multiple physical pages in the memory block, the third logical value is different from the numerical value of the first logical value; the updating the first bitmap in response to the bitmap type associated with the overwritten initial source memory block being the first bitmap described above includes: in response to the bitmap associated with the overwritten initial source memory block being the first bitmap, adjusting the target first logical value in the first bitmap to be the third logical value; where, the target first logical value is to identify the physical page in which the data of the first logical page being overwritten is located.

In an example of the present disclosure, the method of operating the memory system may be performed by the memory controller in the memory system in any of the aforementioned examples, and the technical effects that can be achieved by the memory system in the aforementioned examples can also be achieved by the method of operating the memory system, and will not be repeated here. Regarding the operating methods in the examples described above, the implementation of each operation has been described in detail in the relevant device examples, and will not be described in detail here.

Figure 11:
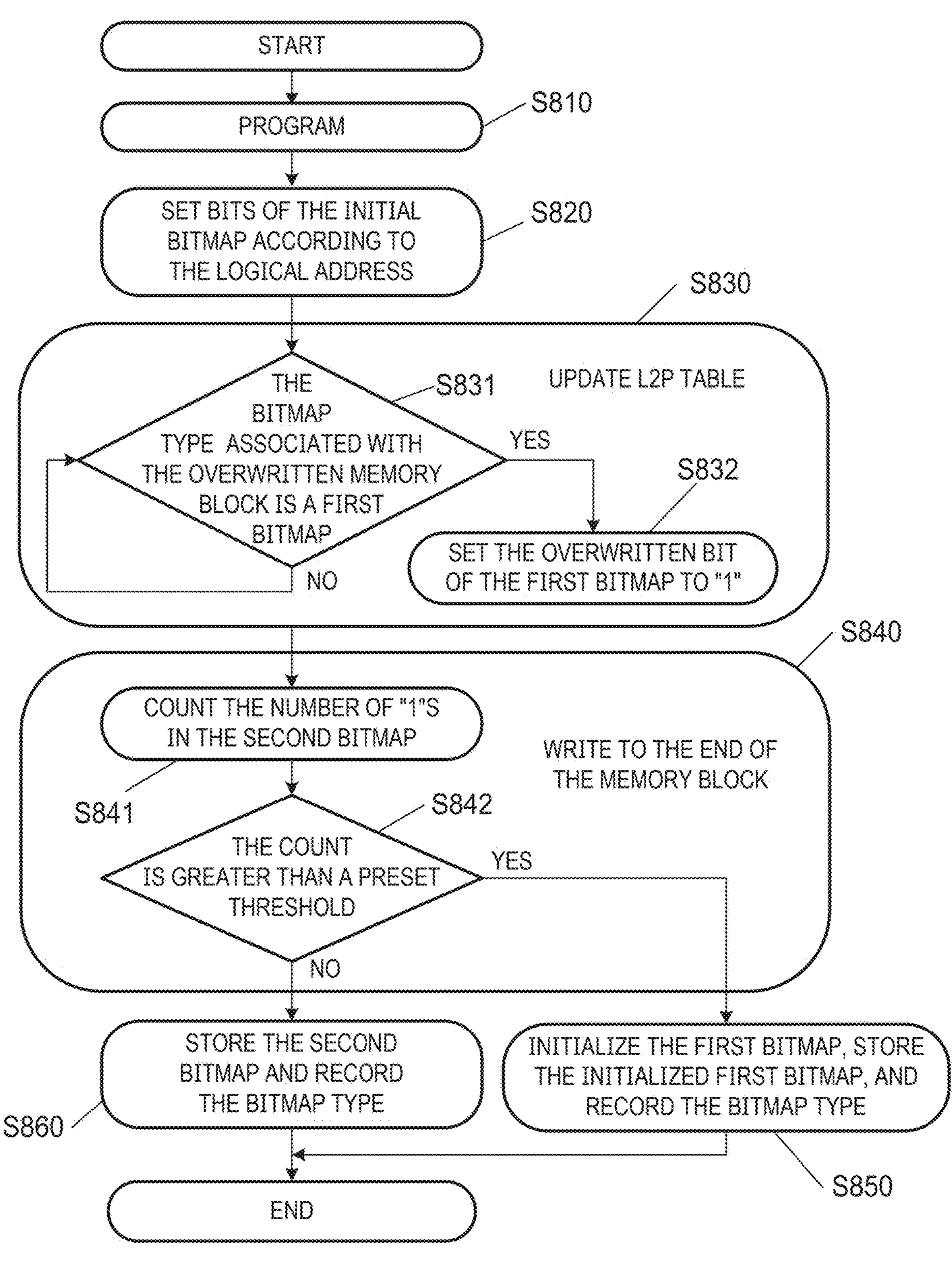
FIG. 11 is a flowchart for generating a first bitmap or a second bitmap shown according to an example of the present disclosure.

FIG. 11 is a flowchart for generating a first bitmap and a second bitmap shown according to an example of the present disclosure, the following will in one example describe a method of operating a memory system provided by an example of the present disclosure in conjunction with FIG. 11.

Referring to FIG. 11, in operation S810: programming. Here, the memory controller may generate a write signal in response to the write command, and the peripheral circuit may program an initial source memory block from the multiple memory blocks in response to the write signal to write the data of the logical page into the initial source memory block. Of course, the memory controller may also write the re-read data to the initial source memory block in the way of programming during the operation of garbage collection.

In operation S820: a bit of the initial bitmap is set according to the logical address. Here, after the data of the logical page is written to the physical page in the initial source memory block, the processor may set the corresponding bit in the initial bitmap associated with the initial source memory block to a logical value "1", the initial bitmap includes the first bitmap and the second bitmap, regarding the initial bitmap, reference may be made to the detailed description in the example described above, which will not be repeated here.

In operation S830: the L2P table is updated. Here, the data of the logical page written into the initial source memory block may be one or more pieces, and each time a piece of data of the logical page is written, the L2P table may be updated once to avoid data loss. In an example, one piece of data in a logical page may be 4 KB.

The operation S830 described above may include operation S831: determining whether the bitmap type associated with the overwritten memory block is a first bitmap. Here, based on the updated L2P table, it may be determined whether data overwriting occurs, and if overwriting occurs, the identification bit of the overwritten memory block may be obtained, thereby the bitmap type associated with the overwritten memory block is determined.

If the first identification bit is obtained, it may be determined that the bitmap associated with the overwritten memory block is the first bitmap, and then operation S832 is performed: the overwritten bit of the first bitmap is set to "1". Here, the overwritten memory block and the initial source memory block are different memory blocks. If the second identification bit is obtained, continue to write the next data and update the L2P table again until the end of the initial source memory block is written, that is, operation S840. Here, writing to the end of the initial source memory block may be understood as the initial memory block is to be fully written with data.

The operation S840 described above may include operation S841: counting the number of "1"s in the second bitmap; and operation S842: determining whether the count is greater than a preset threshold. Through counting the number of "1"s in the second bitmap associated with the initial source memory block, the number of physical pages which store valid data in the initial source memory block may be determined, and when the number of logical values "1" is greater than the preset threshold, the operation S850 may be performed. Here, the number of logical values "1" in the first bitmap associated with the initial source memory block may also be counted.

In operation S850, the first bitmap is initialized, the initialized first bitmap is stored, and the bitmap type is recorded. Here, all bits in the first bitmap may be initialized to logical value "0" to identify the physical page which stores valid data in the initial source memory block, and the initialized first bitmap may be stored in the memory device; and a first identification bit may also be generated to identify that the bitmap type associated with the initial source memory block is the first bitmap.

When the number of logical values "1" is less than or equal to the preset threshold, operation S860 may be performed: the second bitmap is stored and the bitmap type is recorded. Here, the second bitmap may be directly stored in the memory device, and the logical value "1" in the second bitmap is to identify the physical page which stores data; and a second identification bit may also be generated to identify that the bitmap type associated with the initial source memory block is the second bitmap.

At this point, the first bitmap associated with the initial source memory block may be generated through performing the operations S810 to S840 and S850 described above; or the second bitmap associated with the initial source memory block may be generated through performing the operations S810 to S840 and S860 described above.

Figure 12:
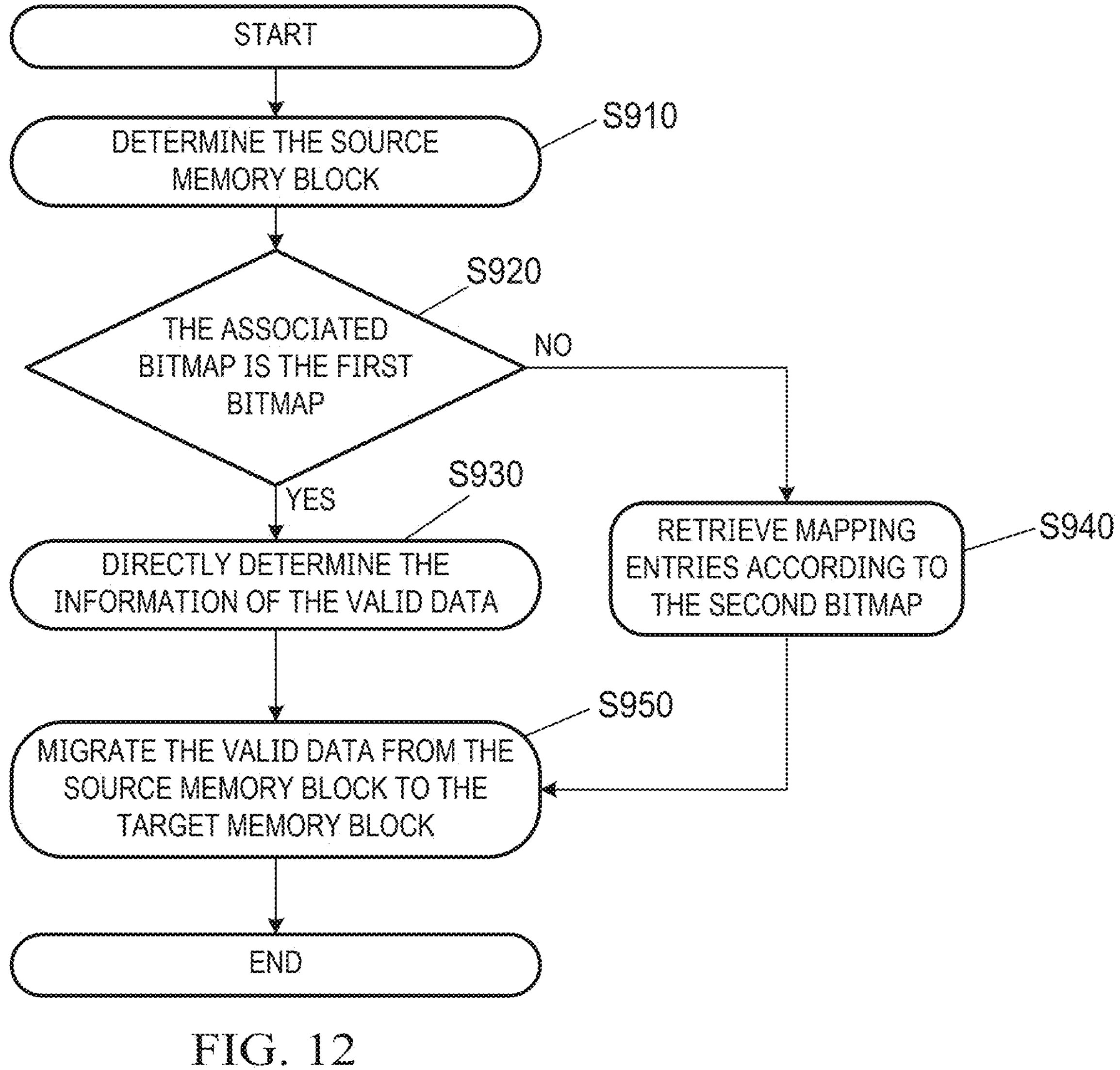
FIG. 12 is a flowchart of an operation of garbage collection shown according to an example of the present disclosure.

FIG. 12 is a flowchart for an operation of garbage collection shown according to an example of the present disclosure, the following will in one example describe a method of operating a memory system provided by an example of the present disclosure in conjunction with FIG. 12.

Referring to FIG. 12, in operation S910: the source memory block is determined. Here, the initial source memory block storing less valid data may be selected as the source memory block based on the greedy algorithm, the number of source memory blocks may be one or more, the bitmap types of any two source memory blocks from multiple source memory blocks may be the same or different.

In operation S920: it is determined whether the bitmap associated with the source memory block is the first bitmap. Here, it may be determined whether the bitmap associated with the source memory block is the first bitmap according to whether the identification bit of the bitmap associated with the source memory block is the first identification bit. If yes, operation S930 is performed: directly determine the information of the valid data. In one example, the L2P table is directly looked up according to the logical value "0" in the first bitmap, the physical address of the physical page which stores the valid data is determined, and the valid data is read based on the physical address.

If not, it is determined that the bitmap associated with the source memory block is the second bitmap, and operation S940 is performed: retrieve a valid mapping entry according to the second bitmap. In one example, according to the logical value "1" in the second bitmap, the L2P table is directly looked up to determine whether a mapping entry exists for the physical page in which the data is stored, if a mapping entry exists, the physical address of the physical page which stores the valid data is determined, and the valid data is read based on the physical address.

After the valid data is read, operation S950 is performed: migrating the valid data from the source memory block to the target memory block. After the migration of the valid data is completed, the source memory block is erased to obtain a usable memory block.

At this point, through performing the operation 910 to operation S950 described above, the operation of garbage collection may be completed.

Based on the memory system described above, an example of the present disclosure also provides a computer readable storage media having instructions stored thereon, which when executed by a processor, implement the operating method of any one of the examples described above.

Here, in order to implement all or part of the processes in the operating methods in the examples described above, this may be accomplished through hardware related to instructions (computer program instructions), the computer program may be stored in a computer-readable storage medium, and the execution of the computer program may include the process of the operating method in any of the examples described above. Where computer-readable storage media may be a magnetic disk, optical disk, read-only memory (ROM), Random Access Memory (RAM), Flash Memory, Hard Disk Drive (HDD) or solid state drive, etc., the computer-readable storage media may also include a combination of the storage medium described above.

The methods disclosed in several method examples provided in the present disclosure may be combined arbitrarily without conflicts to obtain new method examples.

The features disclosed in several apparatus examples provided in the present disclosure may be combined arbitrarily without conflicts to obtain new apparatus examples.

It should be understood that reference throughout the description to "one example" or "an example" means that a particular feature, structure or characteristic related to the example is included in at least one example of the present disclosure. Thus, appearances of "in one example" or "in an example" in various places throughout the description are not necessarily referring to a same example. Furthermore, these particular features, structures or characteristics may be combined in any appropriate manner in one or more examples. It should be understood that in various examples of the present disclosure, sequence numbers of the processes described above do not mean the execution order, and the execution order of each process should be determined by its function and internal logic, and should not constitute any limitation to implementation process of examples of the present disclosure. The serial numbers of examples of the present disclosure described above are for the purpose of description only, and do not represent the advantages and disadvantages of the examples.

It should be noted that, in this description, the terms "including", "containing" or any other variations thereof are intended to cover a non-exclusive inclusion, such that a process, method, article or device that includes a series of elements includes not only those elements but also other elements not expressly listed or that are inherent to the process, method, article or device. Without further limitation, an element defined by the statement "including a . . . " does not exclude the presence of additional identical elements in a process, method, article, or device that includes that element.

The above is only implementations of the present disclosure, but the claimed scope of the present disclosure is not limited thereto, and changes or substitutions within the technical scope disclosed in the present disclosure that may be easily conceived by those skilled in the art shall fall within the claimed scope of the present disclosure. Therefore, the claimed scope of the present disclosure should be determined by the claimed scope of the claims.

What is claimed is:

1. A memory system, comprising:

a memory device comprising multiple memory blocks, a memory block comprising multiple physical pages; and a memory controller coupled to the memory device and configured to:

determine at least one source memory block from the multiple memory blocks;

in response to a bitmap type associated with a first source memory block from the at least one source memory block being a first bitmap, write valid data stored in the first source memory block into a first target memory block from the multiple memory blocks, wherein the first bitmap includes at least one first logical value, the first logical value is to identify a physical page which stores the valid data from the multiple physical pages in the memory block, the first target memory block is different from the source memory block, wherein the first bitmap and a second bitmap each respectively indicate to perform a different operation on the source memory block; and in response to the valid data being written into the first target memory block, erase the source memory block.

2. The memory system of claim 1, wherein the memory controller is further configured to:

in response to a bitmap type associated with a second source memory block from the at least one source memory block being the second bitmap, determine a physical page which stores data in the second source memory block, wherein the second bitmap includes at least one second logical value, the second logical value is to identify a physical page which stores data from the multiple physical pages in the memory block, and the second logical value is different from the first logical value;

in response to a logical address to physical address mapping table, determine whether the data stored in the physical page which stores data in the second source memory block is valid; and in response to the data stored in the physical page which stores data in the second source memory block being valid, write the valid data stored in the second source memory block into the first target memory block.

3. The memory system of claim 2, wherein the memory controller is further configured to:

determine whether the bitmap type associated with the source memory block is the first bitmap or the second bitmap.

4. The memory system of claim 2, wherein the memory controller is configured to:

in response to a first write command, write data of a first logical page indicated by the first write command into an initial source memory block from the multiple memory blocks; wherein, the initial source memory block is different from the first target memory block;

in response to the data of the first logical page being written into the initial source memory block, update an initial bitmap associated with the initial source memory block; wherein the initial bitmap includes the first bitmap and the second bitmap;

in response to the updated initial bitmap, determine a number of physical pages which store valid data in the initial source memory block; wherein the physical page which stores valid data in the initial source memory block includes a physical page which stores the data corresponding to the first logical page; and in response to the number of physical pages which store valid data in the initial source memory block being greater than a preset threshold, store the first bitmap in the memory device.

5. The memory system of claim 4, wherein the memory controller is further configured to:

in response to the number of physical pages which store valid data in the initial source memory block being less than or equal to the preset threshold, store the second bitmap in the memory device.

6. The memory system of claim 5, wherein the memory controller is further configured to:

in response to the first bitmap being stored in the memory device, generate a first identification bit, and store the first identification bit in the memory device, wherein the first identification bit is to indicate the bitmap type of the first bitmap; and in response to the second bitmap being stored in the memory device, generate a second identification bit, and store the second identification bit in the memory device, wherein the second identification bit is to indicate the bitmap type of the second bitmap, and the second identification bit is different from the first identification bit.

7. The memory system of claim 5, wherein the memory controller is further configured to:

in response to a second write command following the first write command, write data of a second logical page indicated by the second write command into a second target memory block from the multiple memory blocks; wherein, the second target memory block is different from the first target memory block;

in response to the data of the second logical page being written into the second target memory block, update the logical address to physical address mapping table;

in response to the updated logical address to physical address mapping table, determine whether the data of the first logical page is overwritten;

in response to the data of the first logical page being overwritten, determine a bitmap type associated with the initial source memory block in which overwritten data of the first logical page is located; and in response to the bitmap type associated with overwritten initial source memory block being the first bitmap, update the first bitmap.

8. The memory system of claim 7, wherein the memory controller is further configured to:

in response to the bitmap type associated with the overwritten initial source memory block being the second bitmap, keep the second bitmap to be unchanged.

9. The memory system of claim 7, wherein the first bitmap further includes at least one third logical value, wherein the third logical value is to identify a physical page which stores invalid data from the multiple physical pages in the memory block, a numerical value of the third logical value is different from a numerical value of the first logical value, and the memory controller is configured to:

in response to the bitmap type associated with the overwritten initial source memory block being the first bitmap, adjust a target first logical value in the first bitmap to be the third logical value, wherein the target first logical value is to identify the physical page in which the data of the first logical page being overwritten is located.

10. The memory system of claim 4, wherein the memory controller is further configured to:

select at least one initial source memory block from multiple of the initial source memory blocks as the source memory block.

11. A method of operating a memory system, wherein the memory system comprises: a memory controller and a memory device coupled to the memory controller, the memory device includes multiple memory blocks, a memory block includes multiple physical pages, and the method comprises:

determining at least one source memory block from the multiple memory blocks;

in response to a bitmap type associated with a first source memory block from the at least one source memory block being a first bitmap, writing valid data stored in the first source memory block into a first target memory block from the multiple memory blocks, wherein the first bitmap includes at least one first logical value, the first logical value is to identify a physical page which stores the valid data from the multiple physical pages in the memory block, the first target memory block is different from the source memory block, wherein the first bitmap and a second bitmap each respectively indicate to perform a different operation on the source memory block; and in response to the valid data being written into the first target memory block, erasing the source memory block.

12. The method of claim 11, further comprising:

in response to a bitmap type associated with a second source memory block from the at least one source memory block being the second bitmap, determining a physical page which stores data in the second source memory block; wherein the second bitmap includes at least one second logical value, the second logical value is to identify a physical page which stores data from the multiple physical pages in the memory block, the second logical value is different from the first logical value;

in response to a logical address to physical address mapping table, determining whether the data stored in the physical page which stores data in the second source memory block is valid; and in response to the data stored in the physical page which stores data in the second source memory block being valid, writing the valid data stored in the second source memory block into the first target memory block.

13. The method of claim 12, further comprising:

determining whether the bitmap type associated with the source memory block is the first bitmap or the second bitmap.

14. The method of claim 12, further comprising:

in response to a first write command, writing data of a first logical page indicated by the first write command into an initial source memory block from the multiple memory blocks; wherein, the initial source memory block is different from the first target memory block;

in response to the data of the first logical page being written into the initial source memory block, updating an initial bitmap associated with the initial source memory block; wherein the initial bitmap includes the first bitmap and the second bitmap;

in response to the updated initial bitmap, determining a number of physical pages which store valid data in the initial source memory block; wherein the physical page which stores valid data in the initial source memory block includes a physical page which stores the data of the first logical page; and in response to the number of physical pages which store valid data in the initial source memory block being greater than a preset threshold, store the first bitmap in the memory device.

15. The method of claim 14, further comprising:

in response to the number of physical pages which store valid data in the initial source memory block being less than or equal to the preset threshold, storing the second bitmap in the memory device.

16. The method of claim 15, further comprising:

in response to the first bitmap being stored in the memory device, generating a first identification bit, and storing the first identification bit in the memory device, wherein the first identification bit is to indicate the bitmap type of the first bitmap; and in response to the second bitmap being stored in the memory device, generating a second identification bit, and storing the second identification bit in the memory device, wherein the second identification bit is to indicate the bitmap type of the second bitmap, the second identification bit is different from the first identification bit.

17. The method of claim 15, further comprising:

in response to a second write command following the first write command, writing data of a second logical page indicated by the second write command into a second target memory block from the multiple memory blocks; wherein, the second target memory block is different from the first target memory block;

in response to the data of the second logical page being written into the second target memory block, updating the logical address to physical address mapping table;

in response to the updated logical address to physical address mapping table, determining whether the data of the first logical page is overwritten;

in response to the data of the first logical page being overwritten, determining a bitmap type associated with the initial source memory block in which overwritten data of the first logical page is located; and in response to the bitmap type associated with overwritten initial source memory block being the first bitmap, updating the first bitmap.

18. The method of claim 17, further comprising:

in response to the bitmap type associated with the overwritten initial source memory block being the second bitmap, keeping the second bitmap to be unchanged.

19. The method of claim 14, wherein the determining at least one source memory block from the multiple memory blocks includes:

selecting at least one initial source memory block from multiple of the initial source memory blocks as the source memory block.

20. A non-transitory, computer readable storage media having instructions stored thereon, that when executed by a processor, implement a method of operating a memory system, wherein the memory system comprises: a memory controller and a memory device coupled to the memory controller, the memory device includes multiple memory blocks, the memory block includes multiple physical pages, and the method comprises:

determining at least one source memory block from the multiple memory blocks;

in response to a bitmap type associated with a first source memory block from the at least one source memory block being a first bitmap, writing valid data stored in the first source memory block into a first target memory block from the multiple memory blocks, wherein the first bitmap includes at least one first logical value, the first logical value is to identify a physical page which stores the valid data from the multiple physical pages in the memory block, the first target memory block is different from the source memory block, wherein the first bitmap and a second bitmap each respectively indicate to perform a different operation on the source memory block; and in response to the valid data being written into the first target memory block, erasing the source memory block.

* * * * *